(12) United States Patent
Edsinger et al.

(10) Patent No.: US 11,820,013 B2
(45) Date of Patent: *Nov. 21, 2023

(54) MOBILE MANIPULATION IN HUMAN ENVIRONMENTS

(71) Applicant: Hello Robot, Inc., Martinez, CA (US)

(72) Inventors: Aaron Edsinger, Martinez, CA (US); Charles Kemp, Atlanta, GA (US); Blaine Matulevich, Berkeley, CA (US)

(73) Assignee: Hello Robot, Inc., Martinez, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 17/112,539

(22) Filed: Dec. 4, 2020

(65) Prior Publication Data

US 2021/0170583 A1 Jun. 10, 2021

Related U.S. Application Data

(60) Provisional application No. 62/977,643, filed on Feb. 17, 2020, provisional application No. 62/944,891, filed on Dec. 6, 2019.

(51) Int. Cl.
*B25J 18/02* (2006.01)
*B25J 9/16* (2006.01)
(Continued)

(52) U.S. Cl.
CPC .............. *B25J 9/162* (2013.01); *B25J 5/007* (2013.01); *B25J 9/0003* (2013.01); *B25J 9/023* (2013.01);
(Continued)

(58) Field of Classification Search
CPC ...... G05B 19/4155; G05B 2219/45179; F16H 19/0645; F16H 19/0663; F16H 19/06; F16H 2019/0686
(Continued)

(56) References Cited

U.S. PATENT DOCUMENTS 2,131,261 A 9/1938 Aldeen et al.
3,472,085 A 10/1969 Rosen
(Continued)

FOREIGN PATENT DOCUMENTS

CN 106882723 A 6/2017
DE 3315779 A1 11/1984
(Continued)

*Primary Examiner* — Dalena Tran
(74) *Attorney, Agent, or Firm* — Mintz Levin Cohn Ferris Glovsky and Popeo, P.C.

(57) ABSTRACT

A mobile manipulation system configured to perform objective tasks within human environments is provided. The mobile manipulation system can include a mobile base assembly including a computing device, at least two drive wheels, and a sensor. The mobile manipulation system can include an actuation assembly including a chain cartridge and a drive chain including a plurality of inter-connected links conveying at least one cable within an interior space of each inter-connected link. The actuation assembly system can also include a telescopic structure including a plurality of segments configured to extend and retract telescopically and conveying the drive chain therein. The mobile manipulation system can include a mast attached to the mobile base assembly along which the actuation assembly translates vertically and a head assembly atop the mast including a first collection of sensors. The mobile manipulation system can also include a manipulation payload coupled to the telescopic structure.

24 Claims, 25 Drawing Sheets

(51) Int. Cl.
  *B25J 9/02* (2006.01)
  *B25J 9/10* (2006.01)
  *B25J 5/00* (2006.01)
  *B25J 9/00* (2006.01)
  *B25J 13/08* (2006.01)
  *B25J 15/00* (2006.01)

(52) U.S. Cl.
  CPC ............. *B25J 9/104* (2013.01); *B25J 9/1689* (2013.01); *B25J 9/1697* (2013.01); *B25J 13/08* (2013.01); *B25J 15/0028* (2013.01); *B25J 18/025* (2013.01)

(58) Field of Classification Search
  USPC ........................................................ 700/257
  See application file for complete search history.

(56) References Cited

U.S. PATENT DOCUMENTS

| | | |
|---|---|---|
| 3,672,237 A | 6/1972 | Nagin |
| 4,615,234 A | 10/1986 | Chevance et al. |
| 4,735,563 A | 4/1988 | Tanaka et al. |
| 4,819,495 A | 4/1989 | Hoermann |
| RE33,020 E | 8/1989 | Yokote |
| 5,006,097 A | 4/1991 | Cook |
| 5,271,182 A | 12/1993 | Greisner et al. |
| 6,224,037 B1 | 5/2001 | Novick |
| 6,298,927 B1 * | 10/2001 | Back ...................... E21B 19/20 175/85 |
| 8,069,954 B2 | 12/2011 | Kempf |
| 8,925,405 B2 | 1/2015 | Kawabuchi et al. |
| 9,833,911 B2 | 12/2017 | Yoon |
| 10,907,706 B2 | 2/2021 | Cai et al. |
| 11,345,052 B1 * | 5/2022 | Johnston ................ B25J 18/025 |
| 11,599,091 B2 | 3/2023 | Edsinger et al. |
| 2006/0280587 A1 | 12/2006 | Guerra et al. |
| 2009/0159273 A1 * | 6/2009 | Guerrero ............... E21B 19/083 166/77.2 |
| 2011/0046775 A1 * | 2/2011 | Bailey ..................... B65G 1/06 700/224 |
| 2011/0163151 A1 | 7/2011 | Larsson |
| 2011/0225903 A1 * | 9/2011 | Lounis ................... F16M 11/18 248/188.5 |
| 2011/0308338 A1 | 12/2011 | Schluckebier |
| 2014/0216199 A1 | 8/2014 | Maltby |
| 2015/0337929 A1 | 11/2015 | Hartinger et al. |
| 2016/0334801 A1 | 11/2016 | Ratanaphanyarat et al. |
| 2018/0222732 A1 * | 8/2018 | Manzi ..................... B66F 9/186 |
| 2019/0331204 A1 | 10/2019 | Cai et al. |
| 2021/0173381 A1 | 6/2021 | Edsinger et al. |

FOREIGN PATENT DOCUMENTS

| | | |
|---|---|---|
| EP | 2766620 A1 | 8/2014 |
| WO | 2013053748 A1 | 4/2013 |
| WO | 2021113704 A1 | 6/2021 |
| WO | 2021113726 A1 | 6/2021 |

\* cited by examiner

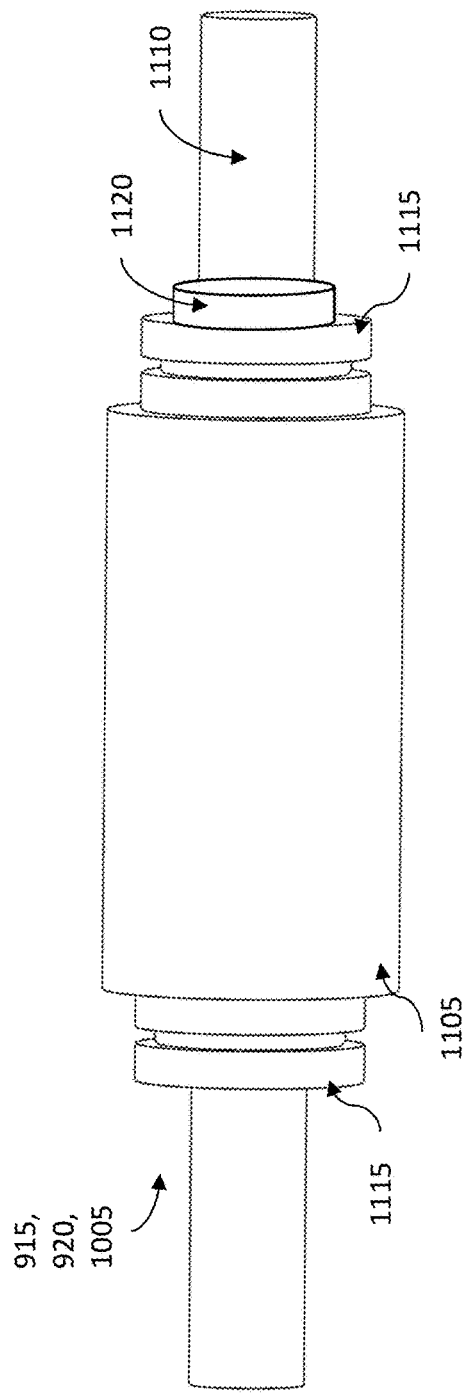
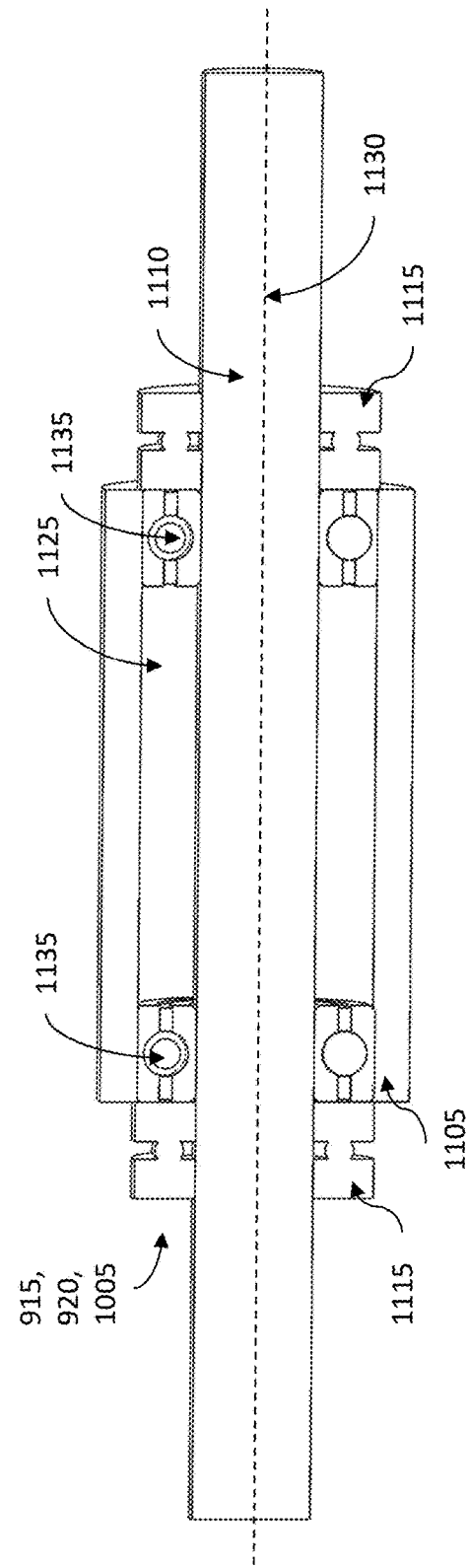

MOBILE MANIPULATION IN HUMAN ENVIRONMENTS

CROSS REFERENCE TO RELATED APPLICATIONS

This application claims the benefit of and priority to U.S. Provisional patent Application No. 62/977,643, filed on Feb. 17, 2020 and entitled "A MOBILE MANIPULATION SYSTEM FOR WORK IN HUMAN ENVIRONMENTS," and to U.S. Provisional Patent Application No. 62/944,891, filed on Dec. 6, 2019 and entitled "METHOD FOR ACTUATING A TELESCOPING MECHANISM FOR A ROBOT". The entire contents of each of which are hereby expressly incorporated by reference herein.

BACKGROUND

Robots can be configured to perform objective tasks in human environments. However, assistive robots interacting in human environments typically have complex mechanical designs, are too large and heavy to be practically fielded in everyday home settings, have limited ability to safely interact with people, and are expensive to purchase and maintain. Robots configured to perform useful work in human environments under autonomous or remote operative control can further increase design complexity and costs. As a result, such robots may be financially unattainable for users who need to rely on assistive devices in everyday activities. In addition, traditional assistive robots can have limited reach and manipulation capabilities relative to important tasks in human environments. Accordingly, there is a need for simple, compact, and safe assistive robotic systems capable of operating autonomously or via remote teleoperation to perform tasks efficiently and safely for humans.

SUMMARY

Traditional assistive mobile manipulator robotic systems can include a wheeled base, one or more dexterous robot arms, and a suite of sensors, such as a 3D camera and/or a light detection and ranging (Lidar) sensor. The kinematic design of dexterous robot arms is typically derived from industrial automation applications and can include a series of five to seven revolute joints located between a proximal shoulder joint and a distal wrist joint. As such, the actuator for each joint must be strong enough to support its distal joints against gravity and dynamic loads. This leads to an amplifying effect where the distal joints, in order to be strong enough to support a moderate payload at the wrist, become large, heavy, and unsafe. When such a heavy arm is deployed in a mobile robot, the mobile robot base must now increase its footprint and mass sufficiently to ensure stability against tipping. This in turn can limit the reachable workspace of the robot, as a long arm that extends beyond the base footprint can cause tipping. In addition, the bulky nature of these dexterous arms can cause them to obscure the sensors' view of the environment, limiting the robot's ability to accomplish objective tasks.

The mobile manipulation system described herein can sense interaction forces, which may be inadvertent, imparted on the system from the environment in which it is deployed. The reduced footprint design and efficient mechanical configuration of components make the mobile manipulation system lightweight, compact, and easily transportable. A number of safety features of the mobile manipulation system ensure injury-free operation when operating in proximity of humans. The mobile manipulation system sensors can reliably sense the environment in which the system is operating independent of sensor position, orientation, field of view, lighting conditions, or obstructions which can typically limit the usefulness of collected sensor data. The sensors of the mobile manipulation system can further enable more human-like dialog or interaction due to their placement atop the mast within the head assembly. The mobile manipulation system described herein can access a larger range of distance using a horizontally and vertically articulating telescopic structure compared to traditional assistive robots.

The manipulator tool, coupled to the telescopic structure can grasp or otherwise interact with a larger variety of objects or environments without requiring complex articulating joints, mechanical linkages, or manipulation accessories programmed to operate with complex motion planning algorithms. The slender profile of the mobile manipulation system can enable the system to self-localize more easily, for example localizing a position of the telescopic structure and manipulator tool can improve actuation time and control command generation when performing a task. The slender design of the mobile manipulation system can also allow sensor data to be collected over a larger amount of space in a given environment.

As a result of these features and benefits, the mobile manipulation system described here can provide more robust performance completing everyday tasks in human environments.

In general, a mobile manipulation system is provided. In one embodiment, the mobile manipulation system can include a mobile base assembly including a first computing device, and at least two drive wheels. The at least two drive wheels can include a first drive wheel coupled to a first actuator and a second drive wheel coupled to a second actuator. The mobile base assembly can also include a first sensor. The mobile manipulation system can also include an actuation assembly including a first chain cartridge. The first chain cartridge can include a drive chain engageably coupled to a drive mechanism of a third actuator. The drive chain can include a first plurality of inter-connected links conveying at least one first cable within a first interior space of each of the first plurality of inter-connected links. The actuation system can also include a telescopic structure including a plurality of segments configured to extend and retract telescopically with respect to one another and conveying the drive chain therein. A first end of the drive chain can couple to a distal segment of the plurality of segments. The mobile manipulation system can also include a mast attached to the mobile base assembly. The actuation assembly can translate vertically along the mast. The mobile manipulation system can further include a head assembly atop the mast and including a first collection of sensors. The mobile manipulation system can also include a manipulation payload coupled to the distal segment of the plurality of segments.

In another embodiment, the actuation assembly can includes a fourth actuator in the mobile base assembly and a second chain cartridge in the mobile base assembly. The second chain cartridge can include a drag chain including a second plurality of inter-connected links conveying at least one second cable within a second interior space of each of the second plurality of interconnected links. The actuation assembly can also include a lift carriage coupling the telescopic arm to the mast. The lift carriage can be coupled to the fourth actuator via a lift carriage drive element.

In another embodiment, one or more of the first actuator, the second actuator, the third actuator or the fourth actuator can include a stepper motor coupled to a controller. In another embodiment, the controller can be configured to receive an input signal from a current sensor or to control a winding current supplied to the stepper motor. In another embodiment, the controller can be configured to receive an input signal from a position sensor and/or to control a rotor position of the stepper motor.

In another embodiment, the lift carriage can include a first portion including a first plurality of rollers and a second portion including a second plurality of rollers. The first portion of the lift carriage and the second portion of the lift carriage can be detachably coupled to one another and can enclose a portion of the mast.

In another embodiment, the first plurality of rollers and the second plurality of rollers can each include roller elements, thrust bearings on opposite sides of the roller elements, and metal support shafts extending through the roller elements. A first end of a metal support shaft can be received within the first portion of the lift carriage and a second end of the metal support shaft can be received within the second portion of the lift carriage.

In another embodiment, the lift carriage can include an internal guide integrally configured within the lift carriage. The internal guide can including a receiving portion coupled to a distal link of the second plurality of inter-connected links. The lift carriage can include a hole through which the at least one second cable passes.

In another embodiment, the mast can include a channel within the mast. The channel can convey the drag chain and the lift carriage drive element within the mast as the lift carriage and the telescopic structure translate vertically on the mast.

In another embodiment, the head assembly can include a plate coupled to the mast, a pair of threaded posts coupled to the plate, and a pulley coupled to the pair of threaded posts. The pulley can receive the lift carriage drive element.

In another embodiment, at least one sensor of the first collection of sensors can be coupled to the head assembly via a support structure configured to position the at least one sensor of the first collection of sensors in an inferior position relative to the support structure.

In another embodiment, the head assembly can include a user interface button, a fifth actuator configured to rotate the head assembly in a horizontal motion relative to a surface on which the mobile manipulation system is located, and a sixth actuator configured to rotate the head assembly in a vertical motion relative to the surface on which the mobile manipulation system is located.

In another embodiment, the first sensor can include a laser rangefinder, a camera, or a sonar sensor. In another embodiment, the first collection of sensors can include at least one of a microphone array, a speaker, a depth finder, a camera, or a laser rangefinder. In another embodiment, the actuation assembly can include one or more USB ports, and one or more threaded inserts for attaching additional sensors to the actuation assembly. In another embodiment, at least one of the mobile base assembly, the actuation assembly, the manipulation payload, or the manipulator tool can include at least one fiducial tag. In another embodiment, the mast can include a surface material including a reflection-reducing material and/or a non-stick material with a low coefficient of friction. In another embodiment, the mast can include one or more passages configured to convey at least one third cable to the head assembly.

In another embodiment, the manipulation payload can include a seventh actuator, a payload drive mechanism, and a manipulator tool coupled to the payload drive mechanism. The manipulator tool can be actuated via the seventh actuator. In another embodiment, the manipulation payload can be positioned in an offset configuration relative to the distal segment of the plurality of segments. In another embodiment, the manipulator tool can actuate in a plurality of motions relative to a surface on which the mobile manipulation system is located. The plurality of motions can include a yaw motion, a pitch motion, a roll motion, a roll-pitch-roll motion, and a roll-pitch-yaw motion. In another embodiment, the yaw motion can cause the manipulator tool to move within a footprint of the mobile base assembly.

In another embodiment, the manipulator tool can include a gripping tool. The gripping tool can include a gripping end and an attachment end. The gripping end can include a pair of tips. Each tip can be coupled to an interior spring arm and to an external spring arm. The attachment end can include a pull-block coupled to an interior spring arm pair and to a winding spool. The winding spool can be coupled to an eighth actuator in the gripping tool via a winding element.

In another embodiment, the mobile base assembly can include a first removable shell and the actuation assembly can include a second removable shell and a third removable shell.

In another embodiment, the first computing device can include a data processor, a memory storing non-transitory computer-executable instructions, and a communication interface configured to receive control commands from a second computing device. The control commands can be executed by the data processor to cause the data processor to control the mobile manipulation system to perform an objective task associated with control commands.

In another embodiment, the second computing device can be located remotely from the first computing device and can include a display and a graphical user interface within the display. The graphical user interface can be configured to provide a visual field of view of an environment in which the mobile manipulation system is located. The visual field of view can be generated from sensor data obtained from the first sensor and/or the first collection of sensors.

In another embodiment, the control commands can be generated by a user interacting with the graphical user interface without direct observation of the environment in which the mobile manipulation system is located.

Non-transitory computer program products (i.e., physically embodied computer program products) are also described that store instructions, which when executed by one or more data processors of one or more computing systems, causes at least one data processor to perform operations and methods described herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which:

FIGS. 11A-11B are diagrams illustrating exemplary embodiments of one or more rollers of the lift carriage as described herein;

Figure 1:
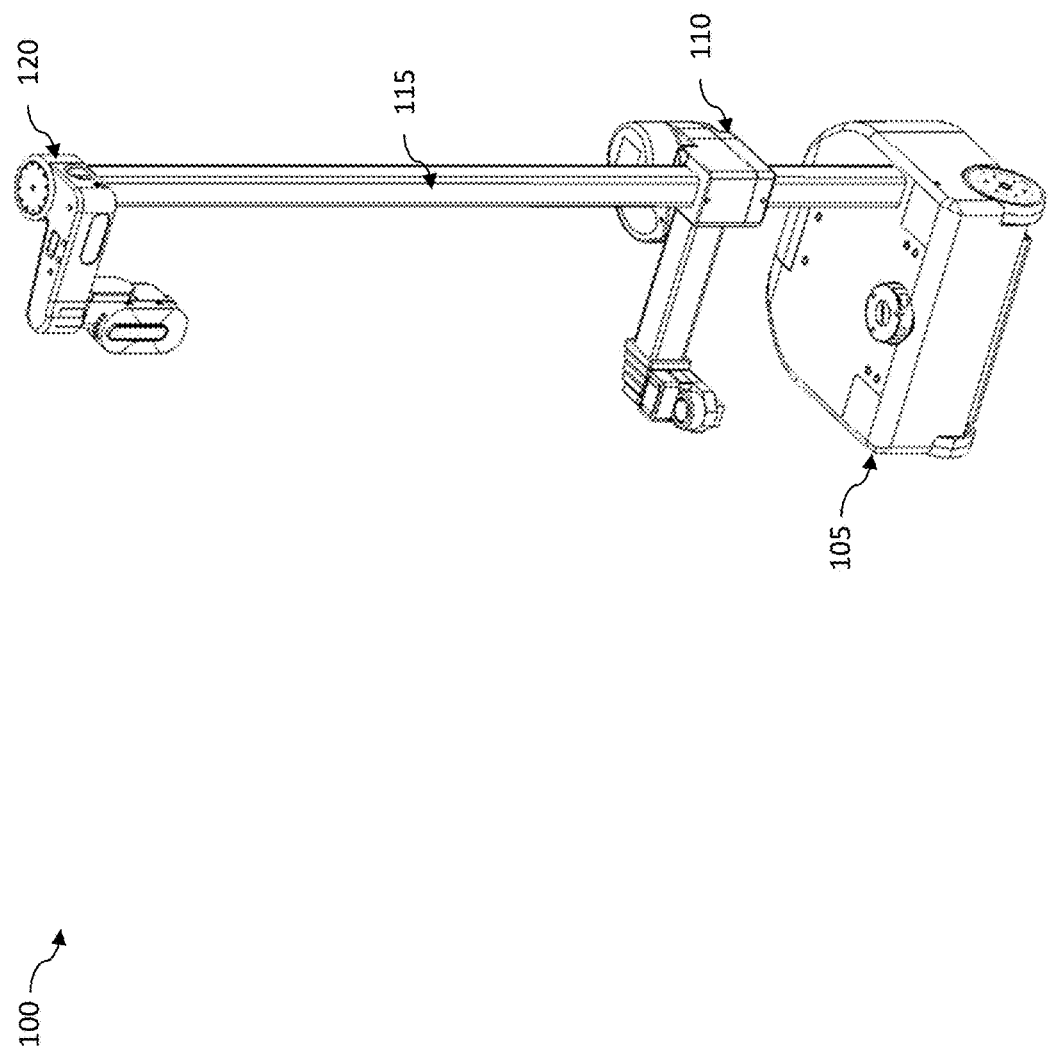
FIG. 1 is a diagram illustrating an exemplary embodiment of a mobile manipulation system as described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

The mobile manipulation system described herein can include a mobile base assembly configured to navigate the mobile manipulation system relative to an object or a task to be performed. The mobile base assembly can provide a rigid platform upon which to mount drive wheels, computing devices, and sensors. The mobile manipulation system can further include an actuation assembly coupled to the mobile base assembly. The actuation assembly can translate vertically along a rigid mast to position a telescopic structure at a vertical position corresponding to the object or task. The telescopic structure can include a plurality of extendable and retractable segments ending in a distal segment to which a manipulator tool can attach. The telescopic structure can extend or retract the manipulator tool in regard to the object or task. The mobile manipulation system can include a head assembly including a sensor suite configured to acquire sensor data associated with the object or task, as well as localization data corresponding to the position or navigation of the mobile manipulation system.

The actuation assembly can include a drive chain including multiple inter-connected links conveying data, power, and/or pneumatic cables or lines therein to the manipulator tool at the distal end of the telescopic structure. The inter-connected links can flex in one direction and can form a rigid arrangement when an actuation force is applied to the drive chain in a different direction. The actuation assembly can also include a chain cartridge from which the drive chain can extend from or retract into.

The drive chain can be coupled to a drive mechanism of an actuation source, such as an actuator or a motor. The drive chain can be coupled to the actuator via a drive transmission, which can enable simultaneous or independent actuation of the telescopic structure in a horizontal direction and actuation of the actuation assembly along the mast in a vertical direction. The manipulator tool can also actuate in multiple degrees of freedom. In this way, the mobile manipulation system can perform a large range of objective tasks in human environments efficiently under autonomous control or user-driven tele-operation.

The footprint of the mobile base can be small enough to navigate through the cluttered human environments while the robot mass distribution, being primarily in the base, can be low enough to be statically stable and not subject to tipping during motion. The arm can have a small cross-sectional area and can extend in a straight horizontal line, allowing it to occupy a smaller volume of space when performing a task. For example, the mobile manipulation system described herein can advantageously reach into cluttered human environments, such as into a refrigerator. The large horizontal and vertical reach of the arm, relative to the base footprint, can create a large reachable workspace, enabling the mobile manipulation system to place its manipulator payload at important locations for an objective task, such as under a couch or to the back of a countertop. The mobile manipulation system can be include a low center of mass and the mast can include a small cross-sectional area, allowing a person to easily tilt the mobile manipulation system onto two wheels and roll it around (like a travel suitcase).

Embodiments of a mobile manipulation system configured to operate autonomously or via remote operation to perform tasks in human environments are discussed herein. However, embodiments of the disclosure can be employed to perform tasks in hazardous or isolated environments which do not include humans without limit.

FIG. 1 is a diagram illustrating an exemplary embodiment of a mobile manipulation system 100 as described herein. As shown in FIG. 1, a mobile manipulation can include a mobile base assembly 105, an actuation assembly 110, a mast 115, and a head assembly 120 atop the mast.

The mobile base assembly 105 can be configured to move the mobile manipulation system 100 with respect to a surface on which the mobile manipulation system 100 is located. The mobile base assembly 105 can enable the mobile manipulation system 100 to be placed in proximity of an object or environment associated with an objective task to be performed by the mobile manipulation system 100. For example, the mobile base assembly 105 can cause the mobile manipulation system 100 to move across a room to access a drawer of a cabinet at which the mobile manipulation system 100 can be configured to open the drawer.

The mobile manipulation system 100 can also include an actuation assembly 110 configured on a mast 115. The actuation assembly 110 can be configured to translate vertically along the mast 115 so as to position the actuation assembly 110 relative to a task or object. The actuation assembly can include a telescopic structure configured to deploy a plurality of segments to reach, retrieve, or otherwise access an object, such as the drawer of the cabinet described above.

The mobile manipulation system 100 can also include a head assembly 120 atop the mast 115. The head assembly 120 can include one or more sensors configured to collect sensor data with respect to an operational environment in which the mobile manipulation system 100 is located, and/or an object associated with an objective task to be performed by the mobile manipulation system 100. For example, the head assembly 120 can collect sensor data providing a user with visual data of the drawer of the cabinet for which the mobile manipulation system 100 can be commanded to open.

Figure 2:
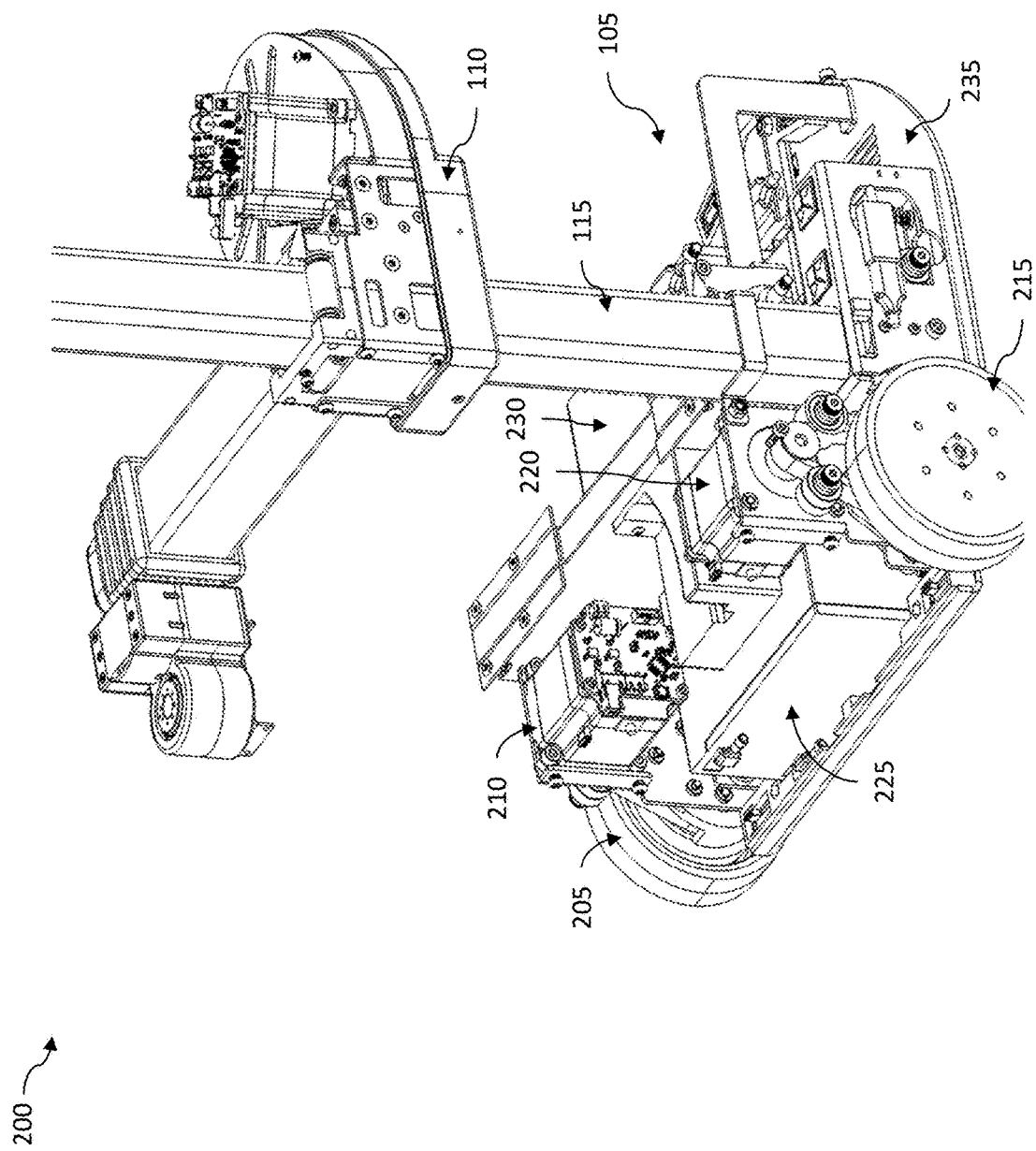
FIG. 2 is a diagram illustrating an exemplary embodiment of a mobile base assembly and an actuation assembly of the mobile manipulation system as described herein.

FIG. 2 is a diagram illustrating an exemplary embodiment 200 of a mobile base assembly 105 and an actuation assembly 110 of the mobile manipulation system 100 as described herein. As shown in FIG. 2, the mobile base assembly 100 can include a first drive wheel 205 and a second drive wheel 215. The first drive wheel 205 can be coupled to a first actuator 210 and the second drive wheel 215 can be coupled to a second actuator 220. The first actuator 210 and the second actuator 220 can, respectively, cause the first drive wheel 205 and the second drive wheel 215 to move the mobile base assembly 105 in a forward direction, a backward direction, as well as to rotate the mobile base assembly 105 in a clock-wise or counter-clock-wise motion parallel to a surface on which the mobile base assembly 105 is located. In some embodiments, the first actuator 210 and the second actuator 220 can operate in unison. In some embodiments, the first actuator 210 and the second actuator 220 can operate independently of one another. In some embodiments, the first actuator 210 and/or the second actuator 220 can be coupled, respectively, to the first drive wheel 205 and/or the second drive wheel 215 via a differential transmission.

As further shown in FIG. 2, the mobile base assembly 105 can include a battery 225 and a computing device 230 mounted on a base platform 235. The battery 225 can provide power to the computing device 230 and any of the actuators and sensors of the mobile manipulation system 100, such as actuators 210, 220 shown in FIG. 2. In some embodiments, the battery 225 can include one or more batteries or one or more battery packs to allow better distribution of mass across the mobile base assembly 105. In some embodiments, the battery 225 can include a sealed lead acid battery or a Lithium-ion battery. The computing device 230 can include a processor, a memory, a communication interface, and one or more I/O interfaces. The memory can store computer-readable and executable instructions, which when executed by the processor can cause the mobile manipulation system 100 to operate in an autonomous or semi-autonomous manner in regard to a particular objective task or in regard to sensor data received by the processor from one or more sensors of the mobile manipulation system 100.

Figure 3:
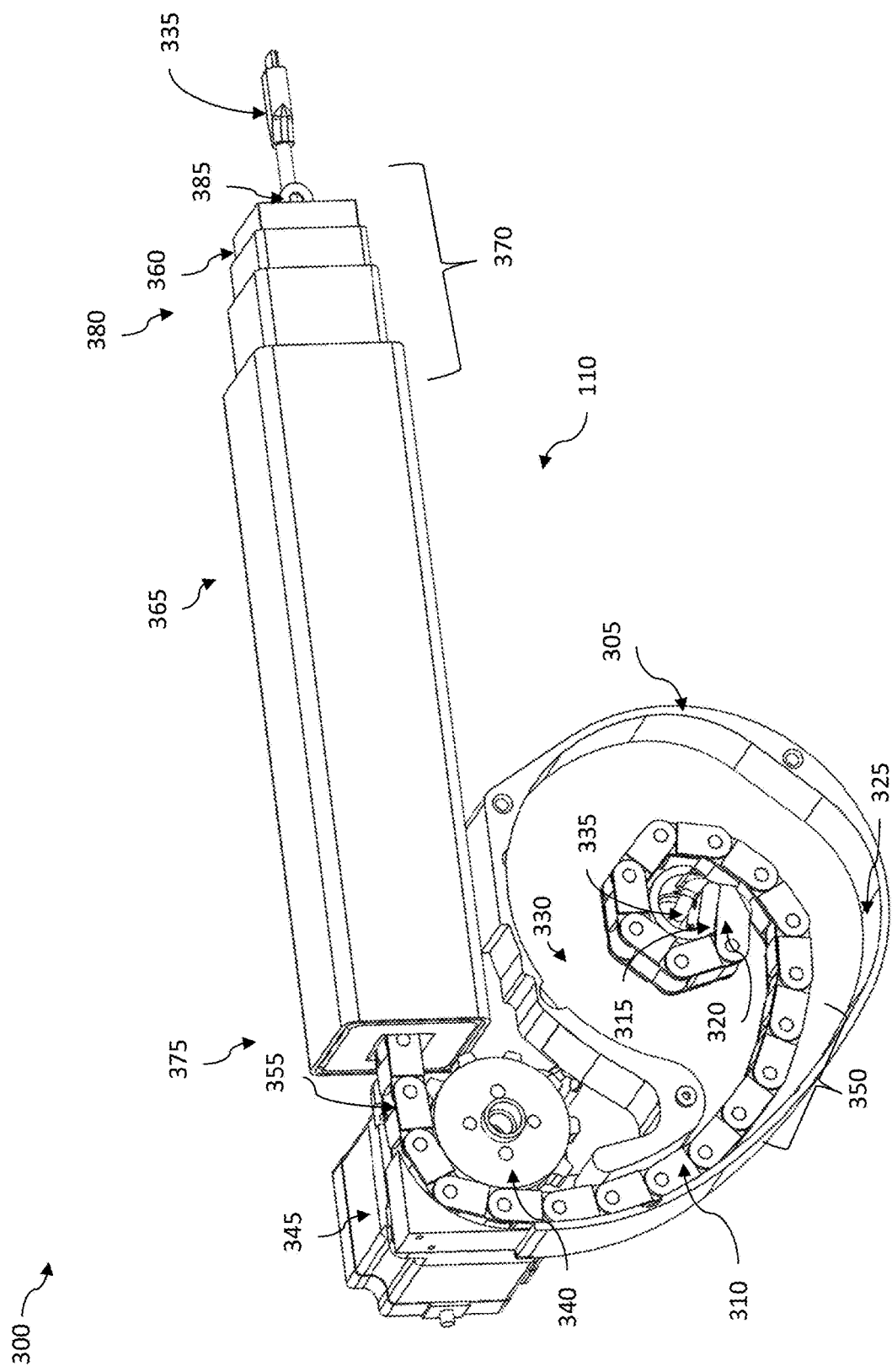
FIG. 3 is a diagram illustrating an exemplary embodiment of the actuation assembly of the mobile manipulation system as described herein.

FIG. 3 is a diagram illustrating an exemplary embodiment 300 of the actuation assembly 110 of the mobile manipulation system 100 as described herein. As shown in FIG. 3, the actuation assembly 110 can include a chain cartridge 305 including a drive chain 310 therein. The chain cartridge 305 can be a self-spooling chain cartridge. The self-guided chain cartridge can include a passively rotating pinion 315 configured to receive a proximal end 320 of the drive chain 310. The self-guided chain cartridge can include one or more curved guide tracks 325 formed on an internal surface 330 of the self-guided chain cartridge 305. As shown in FIG. 3, at least one cable/line 335 can exist the chain cartridge 305 via a slot or opening in the passively rotating pinion 315. In some embodiments, the at least one cable/line 330 can include a service loop or coiling mechanism to reduce damage to or excessive twisting of the at least one cables/line 330 as the passively rotating pinion 315 rotates.

In some embodiments, the chain cartridge 305 can be a guided cartridge including one or more spiral shaped tracks for the drive chain 310 to slide into. The spiral shaped tracks can include a smooth surface formed from spring steel or plastic. In this embodiment, the proximal end 320 of the drive chain 310 is not affixed to the chain cartridge 305 and is free to travel within the spiral shaped tracks during extension or retraction of the drive chain 310 relative to the chain cartridge 305.

The drive chain 310 can be engageably coupled to the drive mechanism 340 of an actuator 345 of the actuation assembly 110. The drive chain 310 can include one or more inter-connected links 350 that can convey the at least one cable/line 335 within an interior space 355 of each link of the inter-connected links 350. In some embodiments, the at least one cables/line 335 can include a data cable, a power cable, and/or a pneumatic line supplying data, power, or pneumatic force, respectively, to a manipulation payload coupled to a distal segment 360 of the telescopic structure 365.

The actuation assembly 110 can also include a telescopic structure 365 including a plurality of segments 370. The plurality of segments 370 can be configured to extend or to retract telescopically from one another, for example, when reaching for, retrieving, or otherwise enabling the mobile manipulation system 100 to interact with respect to an objective task or an object. The plurality of segments 370 of the telescopic structure 365 can receive the drive chain 310 and the at least one cable/line 335 at a proximal end 375 of the telescopic structure 365 and can convey the drive chain 310 and the at least one cable/line 335 to the distal end 380 of the telescopic structure 365. At the distal end 380 of the telescopic structure 365, a distal link 385 of the drive chain 310 can couple to the distal segment 360.

Upon receiving an actuation signal from a controller configured within the mobile manipulation system 100 and coupled to the actuator 345, the actuator 345 can actuate the drive mechanism 340. The drive mechanism 340 can rotate in two directions. In a first direction, the drive mechanism 340 can rotate to cause the drive chain 310 to exit the chain cartridge 305 and to pass into the telescopic structure 365 at the proximal end 375. Rotation in this first direction can cause the drive chain 310 to exert a linear translation force on the distal segment 360 to cause the plurality of segments 370 to extend from within one another. The drive mechanism 315 can rotate in a second direction, opposite to the first direction, to cause the drive chain 310 to retract into the chain cartridge 305 and to exit the telescopic structure 365 at the proximal end 375.

Figure 4:
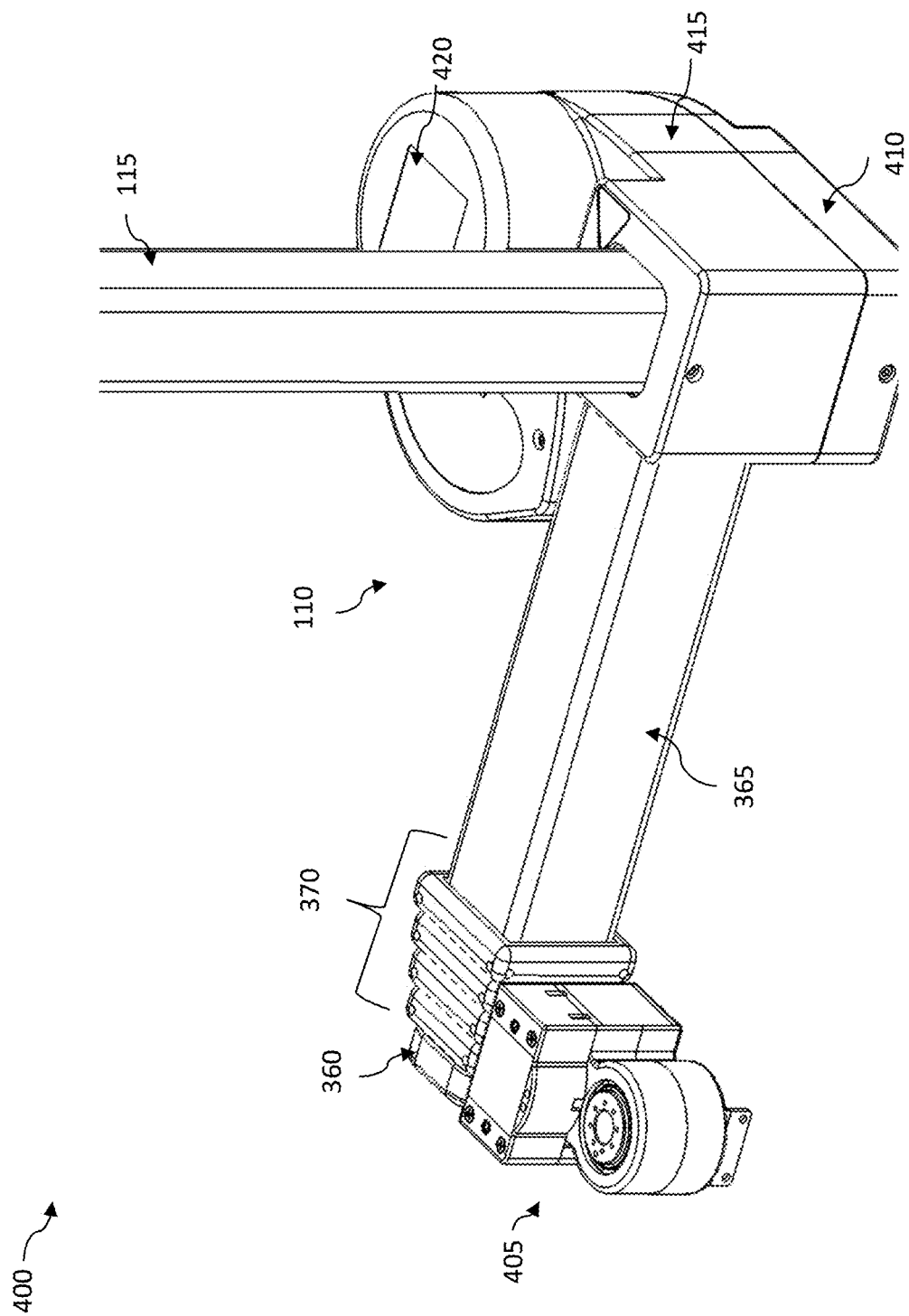
FIG. 4 is a diagram illustrating another exemplary embodiment of the actuation assembly of the mobile manipulation system as described herein.

FIG. 4 is a diagram illustrating another exemplary embodiment 400 of the actuation assembly 110 of the mobile manipulation system 100 as described herein. As shown in FIG. 4, the actuation assembly 110 can include a manipulation payload 405 coupled to the distal segment 360 of the telescopic structure 370. The manipulator payload 405 can include inter-changeable tools, actuators, and/or sensors.

As further shown in FIG. 4, the actuation assembly 110 can include one or more removable shells. For example, a lower shell 410 can couple to an upper shell 415. The shells 410 and 415 can encircle the mast 115 and can provide protection to the components of the actuation assembly 110. The shells 410 and 415 can include wipers or gaskets at locations where the shells 410 and 415 are in proximity to the mast 115 to reduce the incidence of pinching a user's hand when actuation assembly 110 translates along the mast 115. In some embodiments, the shell 415 can include an inset portion 420 to receive a fiducial tag.

Figure 5:
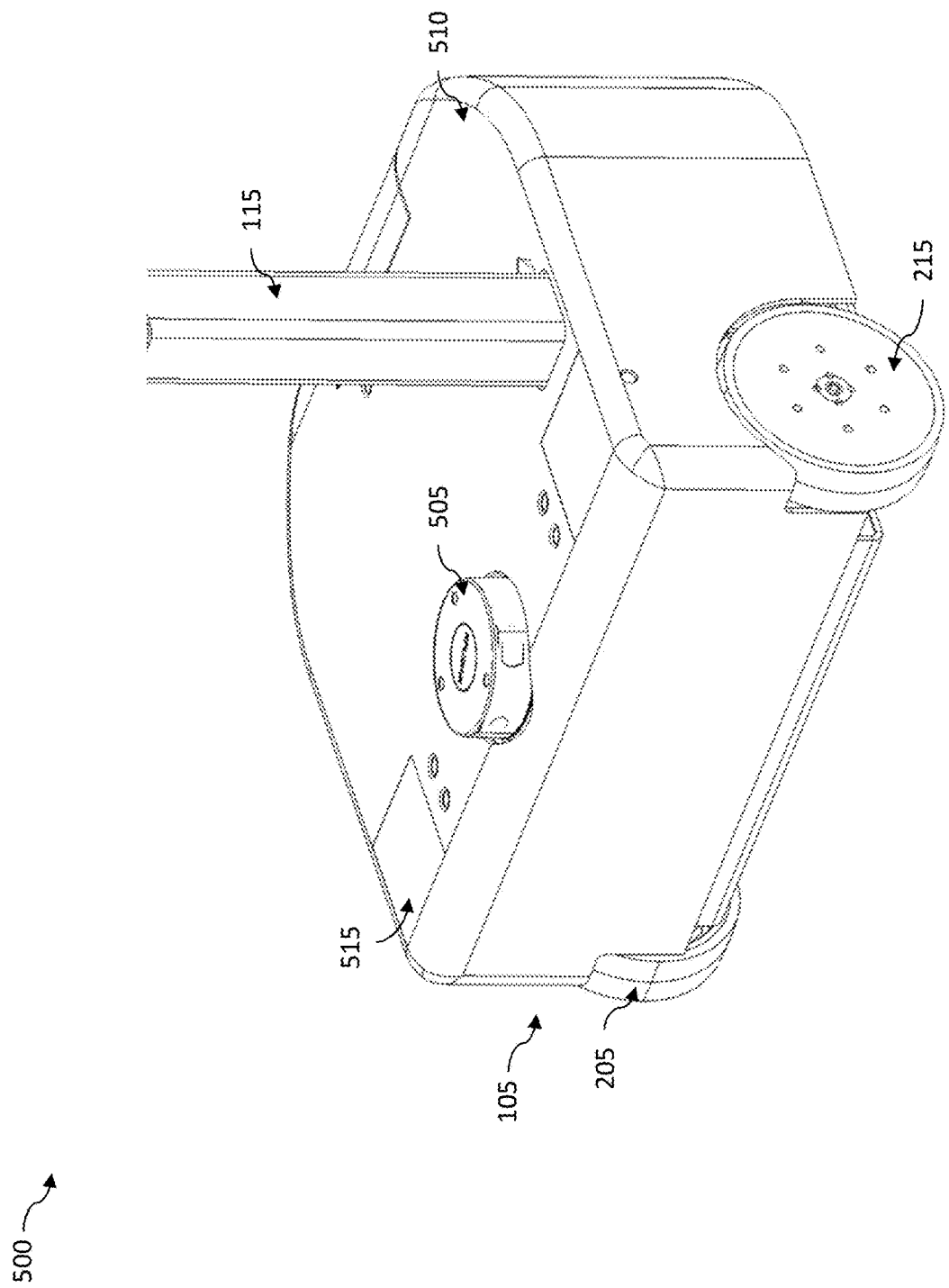
FIG. 5 is a diagram illustrating another exemplary embodiment of the mobile base assembly of the mobile manipulation system as described herein.

FIG. 5 is a diagram illustrating another exemplary embodiment 500 of the mobile base assembly 105 of the mobile manipulation system 100 as described herein. As shown in FIG. 5, the mobile base assembly 105 can sensor 505. The sensor 505 can include a laser rangefinder (as shown in the embodiment of FIG. 5), a camera, or a sonar sensor. The laser rangefinder can spin to collect sensor data associated with a two-dimensional (2D) depth map of an environment in which the mobile manipulation system 100 is operating. The slender design of the mast 115 can allow the laser rangefinder 505 to collect sensor data over a 340 degree field of view.

As further shown in FIG. 5, the mobile base assembly 105 can also include a removable shell 510. The removable shell 510 can include one or more inset portions 515 to receive a fiducial tag. The removable shell 510 can also include a surface paint material painted on to the removable shell 510 or can include a surface material treatment, such as a textured surface. The surface painted material and the surface material treatment can allow the mobile base assembly 105 to be reliably visible to a sensor in the head assembly located atop the mast 115. In this way, the mobile manipulation system 100 can efficiently determine the mobile base assembly 105 with respect to an operational environment or a surface at which the mobile manipulation system 100 is deployed.

Figure 6:
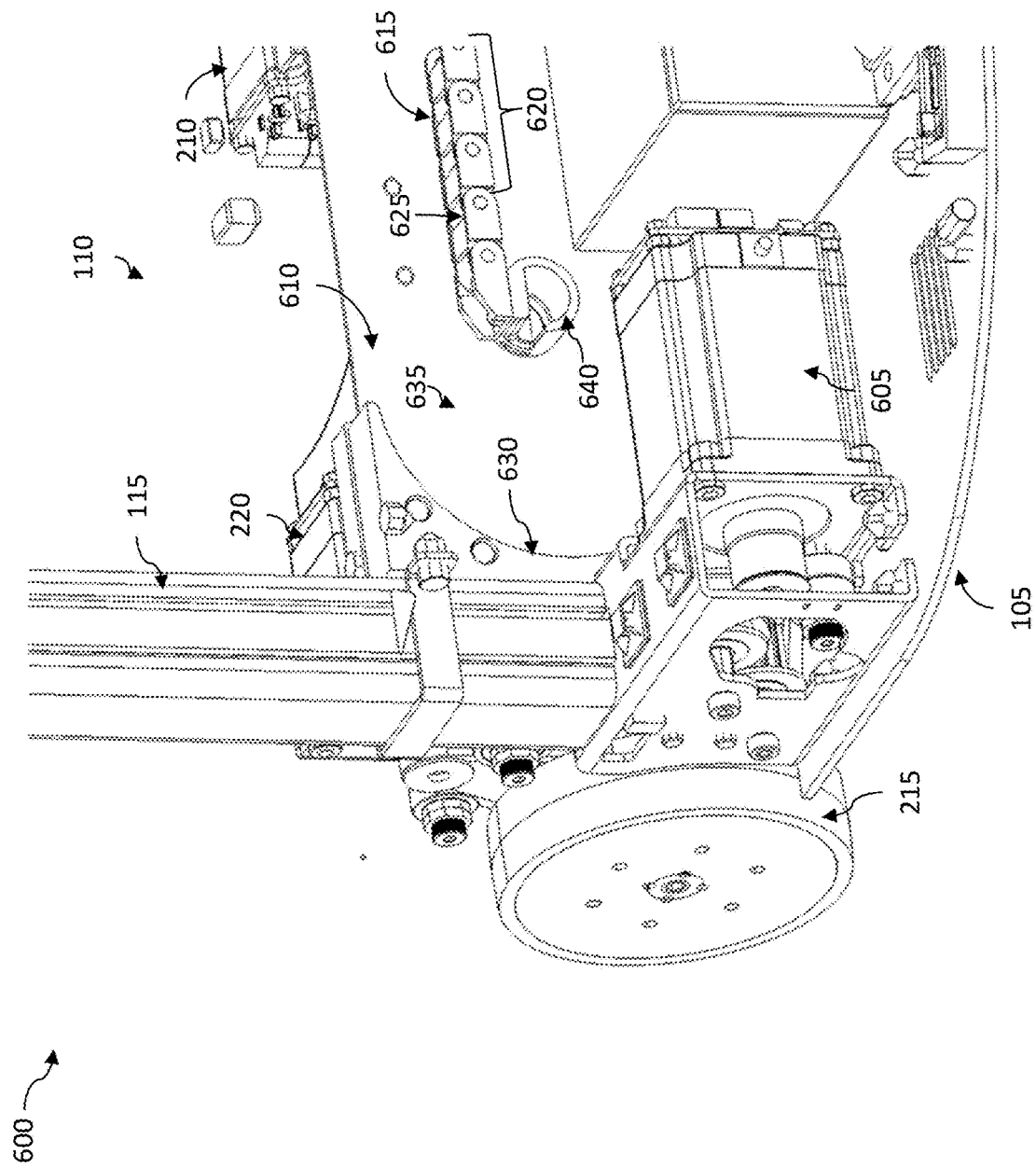
FIG. 6 is a diagram illustrating another exemplary embodiment of the actuation assembly of the mobile manipulation system as described herein.

FIG. 6 is a diagram illustrating another exemplary embodiment 600 of the actuation assembly 110 of the mobile manipulation system 100 as described herein. As shown in FIG. 6, the actuation assembly 110 can also include an actuator 605 in the mobile base assembly 105. The actuation assembly 110 can also include a chain cartridge 610, or a second chain cartridge 610, configured in the mobile base assembly 105. The chain cartridge 610 can include a drag chain 615 formed from a plurality of inter-connected links 620 conveying at least one cable/line, e.g., a second at least one cable/line, within an interior space 625 of each of the plurality of inter-connected links 620. The second at least one cable/line 820 can include at least one of a data cable, a power cable, and/or a pneumatic line. As the actuation assembly 110 is translated vertically along the mast 115, the drag chain 615 can wind or spool into the second chain cartridge 610 and/or unwind or unspool from within the second chain cartridge 610.

The chain cartridge 610 can also include one or more curved guide tracks 630 formed within the internal surface 635 of the chain cartridge 610. The curved guide tracks 630 can guide the drag chain 615 when spooling into or unspooling from within the chain cartridge 610. The chain cartridge 610 can also include a passively-rotating pinion 640 coupled to the internal surface 635 of the chain cartridge 610.

In operation, In operation, the drag chain 615 is withdrawn from within the chain cartridge 610 as the actuator 605 actuates in a first direction imparting a linear translation force on a lift carriage of the actuation assembly 110 causing the lift carriage to ascend upon the mast 115. The drag chain 615 is passively withdrawn from within the chain cartridge 610 as the lift carriage travels up the mast 115. Conversely, the drag chain 615 is pushed into the chain cartridge 610 as the lift carriage descends upon the mast 115. The curved guide tracks 630 can act with rotation of the pinion 640 in response to the actuator 605 imparting a linear translation force on the lift carriage to cause the lift carriage to descend upon the mast so that the drag chain 615 spools within the chain cartridge 610.

Figure 7:
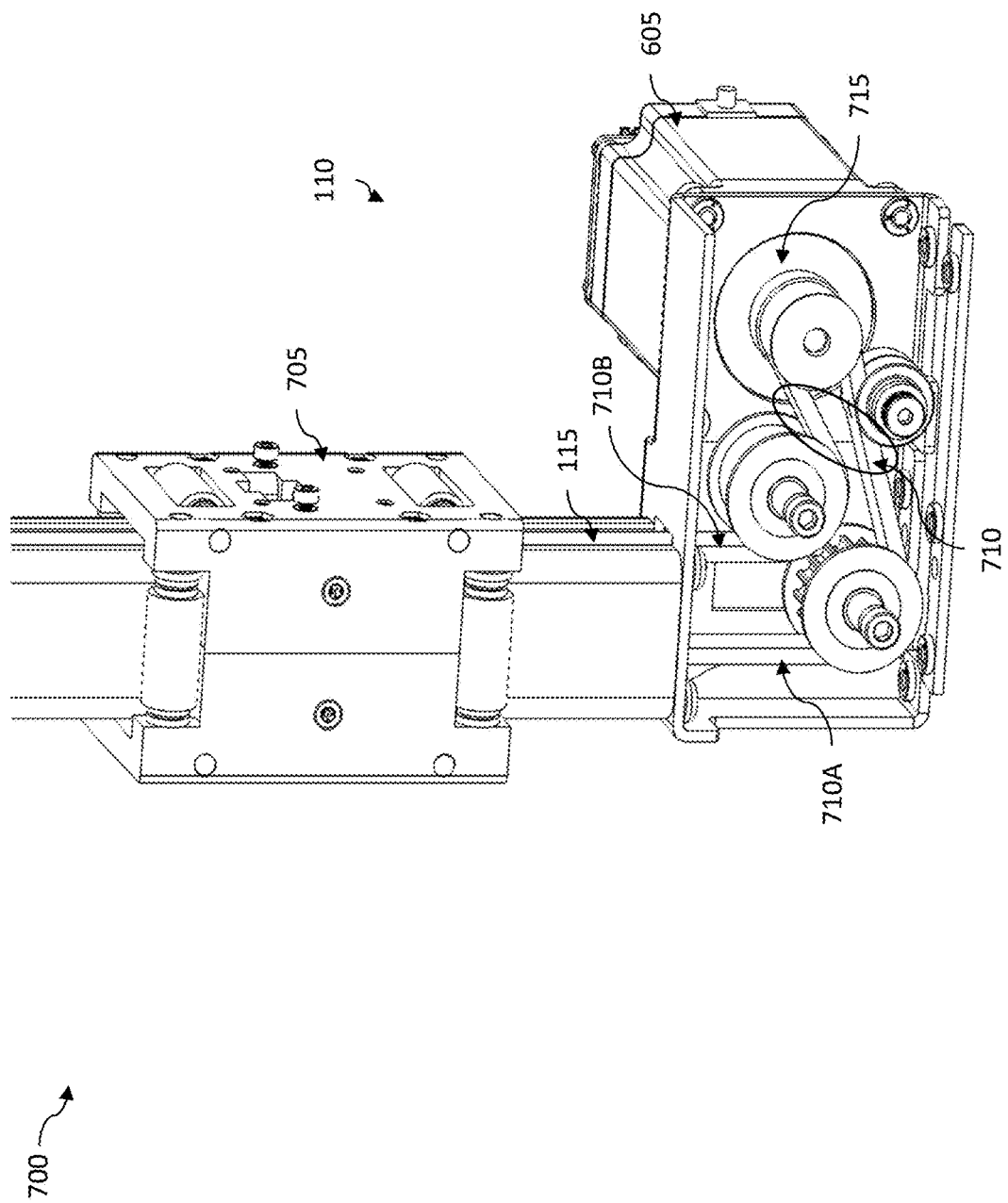
FIG. 7 is a diagram illustrating another exemplary embodiment of the actuation assembly of the mobile manipulation system including a lift carriage as described herein.

FIG. 7 is a diagram illustrating an exemplary embodiment 700 of a lift carriage 705 of the actuation assembly 110 of the mobile manipulation system 100 as described herein. As shown in FIG. 7, the actuation assembly 110 can include a lift carriage 705. The lift carriage 705 can be coupled to the actuator 605 via a lift carriage drive element 710. The lift carriage drive element 710 can be a single belt forming a closed loop as shown in the circle corresponding to reference 710 where a first end of the belt is coupled to a drive mechanism 715 of the actuator 605. A second end of the lift carriage 705 can coupled to the mast 115. Portions 710A and 710B of the lift carriage drive element 710 can travel vertically within the mast 115. As the lift carriage 705 travels vertically along the mast 115, the actuation assembly 110 and the telescopic structure 365 are conveyed vertically on the mast 115 via the lift carriage drive element 710. Rotation of the drive mechanism 715 of the actuator 605 in a first direction can cause the lift carriage drive element 710 move the lift carriage 705 in an upward direction on the mast 115. Rotation of the drive mechanism 715 in a second direction, opposite to the first direction, can cause the lift carriage 715 to move in a downward direction on the mast 115.

Figure 8:
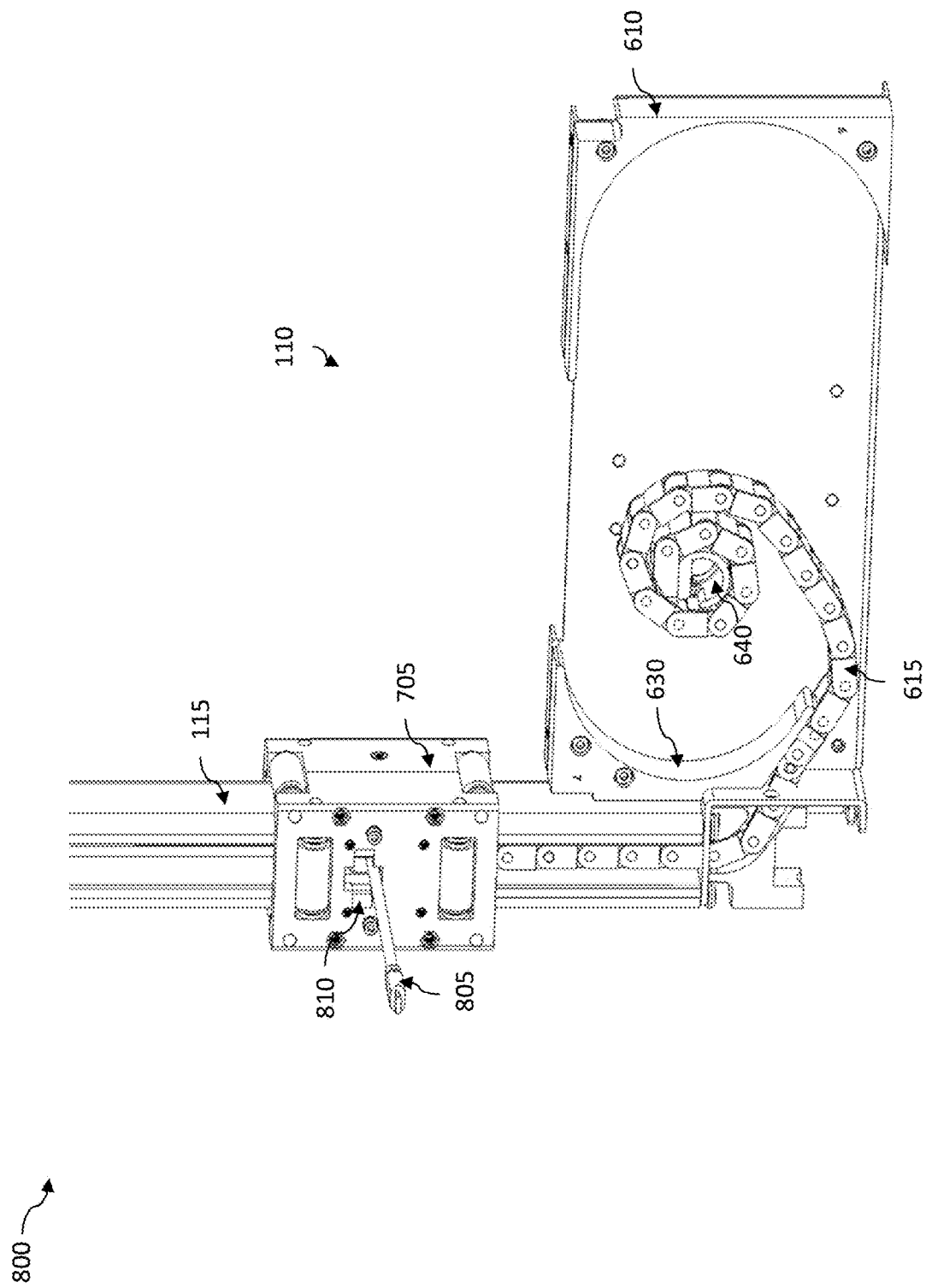
FIG. 8 is a diagram illustrating another exemplary embodiment of the chain cartridge of the actuation assembly of the mobile manipulation system as described herein.

FIG. 8 is a diagram illustrating another exemplary embodiment 800 of the chain cartridge 610 of the actuation assembly 110 of the mobile manipulation system 100 as described herein. As shown in FIG. 8, the chain cartridge 610 can include the drag chain 615 therein. The drag chain 615 can couple to the lift carriage 705 and can convey at least one cable/line 805 within the drag chain 615. The at least one cable/line 805 can exit the lift carriage 705 at an opening 810.

Figure 9:
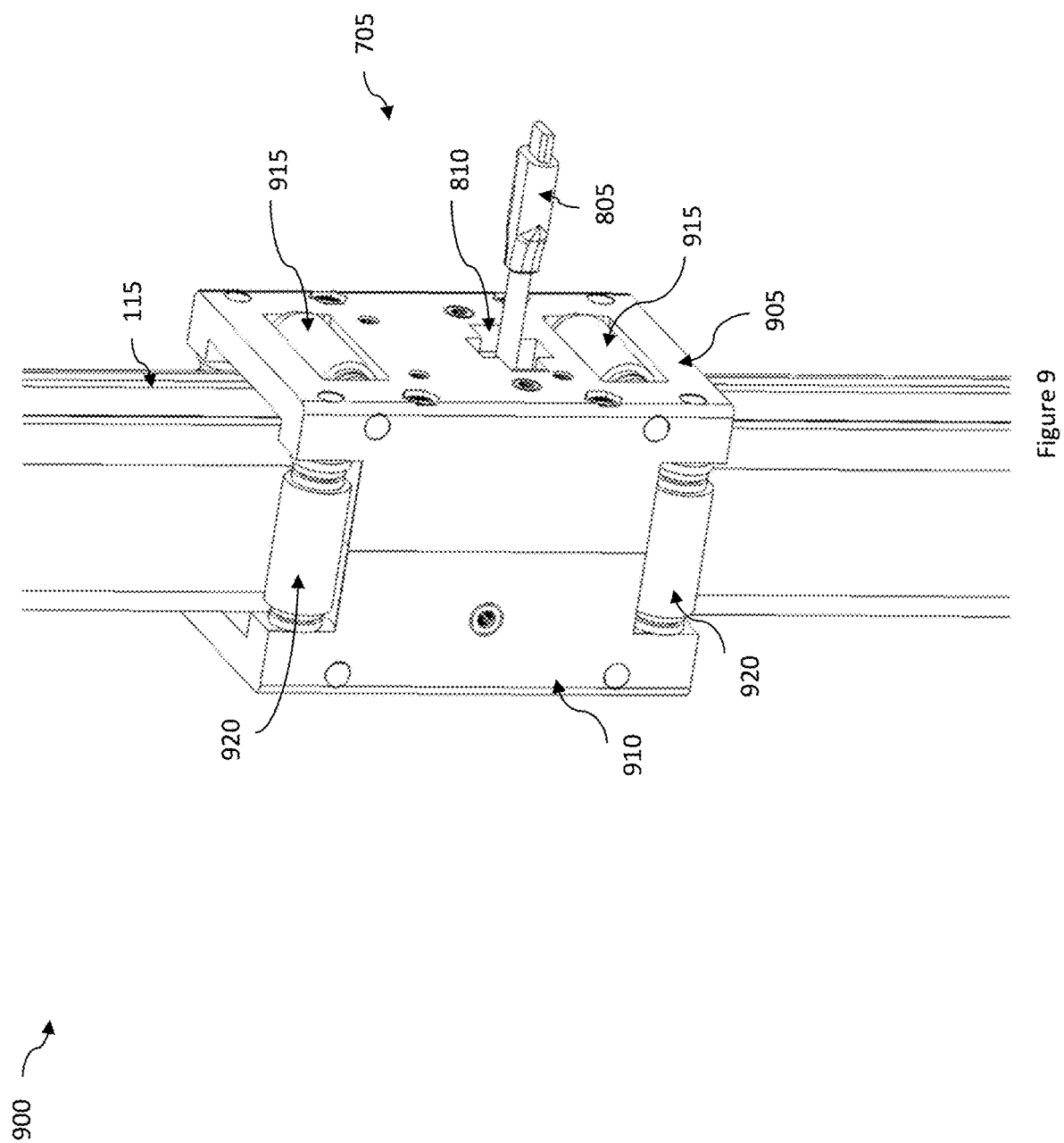
FIG. 9 is a diagram illustrating an exemplary embodiment of the lift carriage of mobile manipulation system as described herein.

FIG. 9 is a diagram illustrating an exemplary embodiment 900 of the lift carriage 705 of mobile manipulation system 100 as described herein. As shown in FIG. 9, the lift carriage 705 can be formed in one or more portions, which can be detachable from one another and from the mast 115. For example, the lift carriage 705 can include a first portion 905 and a second portion 910. The portions 905, 910 can be detached from one another and from the mast 115, to access or adjust the lift carriage drive element 710 or the at least one cable/line 805 exiting the drag chain 615. The first portion 905 and the second portion 910 can enclose a portion of the mast 115. The first portion 905 can include a first plurality of rollers 915. The second portion 910 can include a second plurality of rollers, further shown and described in relation to FIG. 10. The first portion 905 and/or the second portion 910 can also include or be coupled to a third plurality of rollers 920.

Figure 10:
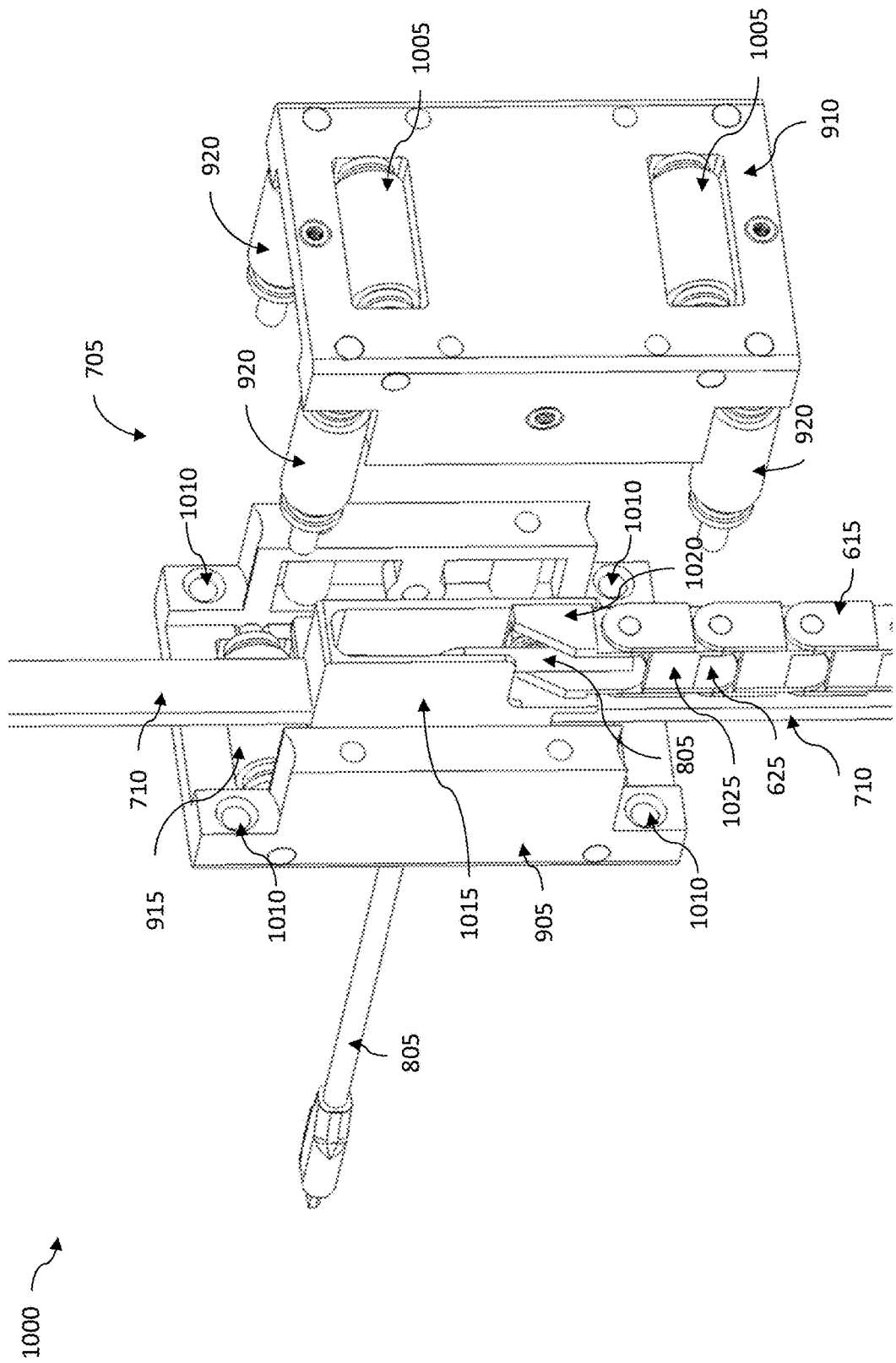
FIG. 10 is a diagram illustrating another exemplary embodiment of the lift carriage of the mobile manipulation system as described herein.

FIG. 10 is a diagram illustrating another exemplary embodiment 1000 of the lift carriage 705 of the mobile manipulation system 100 as described herein. The first portion 905 of the lift carriage 705 can include rollers 915 shown and described in relation to FIG. 9. The second portion 910 of the lift carriage 705 can include a second plurality of rollers 1005. The third plurality of rollers 920 can coupled the first portion 905 and the second portion 910. The third plurality of rollers 920 can be received in a plurality of roller receiving portions 1010. The roller receiving portions 1010 can be cavities configured within the first portion 905 and/or the second portion 910 of the lift carriage 705. The rollers 915, 920, and 1005 can be cylindrical rollers configured to provide a reduced friction surface to facilitate vertical travel of the lift carriage 705 on the mast 115. In some embodiments, the rollers 915, 920, and 1005 can be formed of engineering plastic.

As shown in FIG. 10, the first portion 905 can include an internal guide 1015. The internal guide 1015 can be integrally formed within either of the first portion 905 or the second portion 910 of the lift carriage 705. The internal guide 1015 can include an internal guide receiving portion 1020 configured to receive a distal link 1025 of the drag chain 615. The at least one cable/line 805 conveyed within the interior space 625 of the inter-connected links forming the drag chain 615 can exit the distal segment 1025 to pass through internal guide receiving portion 1020 and into the internal guide before exiting the lift carriage 705 via the opening 810 shown in FIGS. 8 and 9.

FIGS. 11A-11B are diagrams illustrating exemplary embodiments of rollers 915, 920, 1005 of the lift carriage 705 as described herein. As shown in FIG. 11A, rollers 905, 920, and 1005 can include a roller element 1105. A metal support shaft 1110 can be configured to extend through the roller element 1105. Each end of the metal support shaft 1110 can be received within a roller receiving portion 1010 shown in FIG. 10 configured in the first portion 905 and the second portion 910 of the lift carriage 705. The rollers 905, 920, and 1005 can also include a thrust bearing 1115 configured on opposite sides of the roller element 1105. The thrust bearing 1105 can be configured to retain the roller element 1105 in position on the metal support shaft 1110. In some embodiments, the rollers 905, 920, and 1005 can include a keeper 1120 configured to the components of the rollers 905, 920, and 1005 in place during assembly.

FIG. 11B illustrates a cross-sectional view of rollers 905, 920, and 1005 taken along a longitudinal axis 1130 around which the rollers 905, 920, and 1005 rotate. As shown in FIG. 11B, the roller element 1105 can be a hollow bore roller element 1105 and can include an hollow inner bore 1125. The roller element 1105 can include a plurality of radial bearings 1135 positioned within the roller element 1105. In some embodiments, needle bearings can be used in place of radial bearings 1135.

Figure 12:
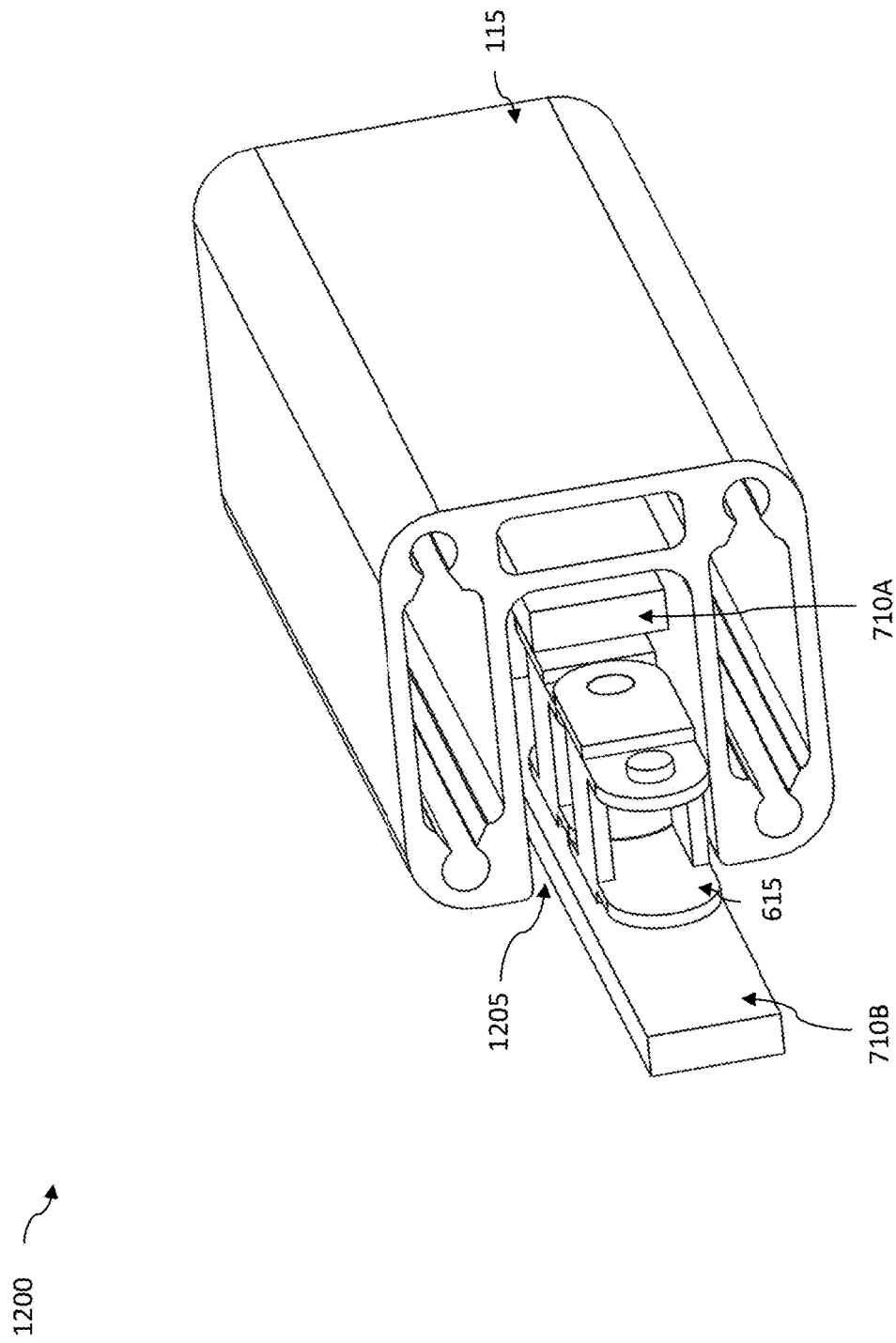
FIG. 12 is a diagram illustrating an exemplary embodiment of a channel of the mast of the mobile manipulation system as described herein.

FIG. 12 is a diagram illustrating an exemplary embodiment 1200 of a channel 1205 of the mast 115 of the mobile manipulation system 100 as described herein. As shown in FIG. 12, the mast 115 includes a channel 1205 formed within the mast 115. The channel 1205 can be substantially C-shaped or U-shaped and can be configured to allow the first portion 710A and the second portion 710B travel within the mast 115. The channel 1205 can also be configured to allow the drag chain 615 to travel within the mast 115 as the lift carriage 705 travels vertically upon the mast 115.

Figure 13:
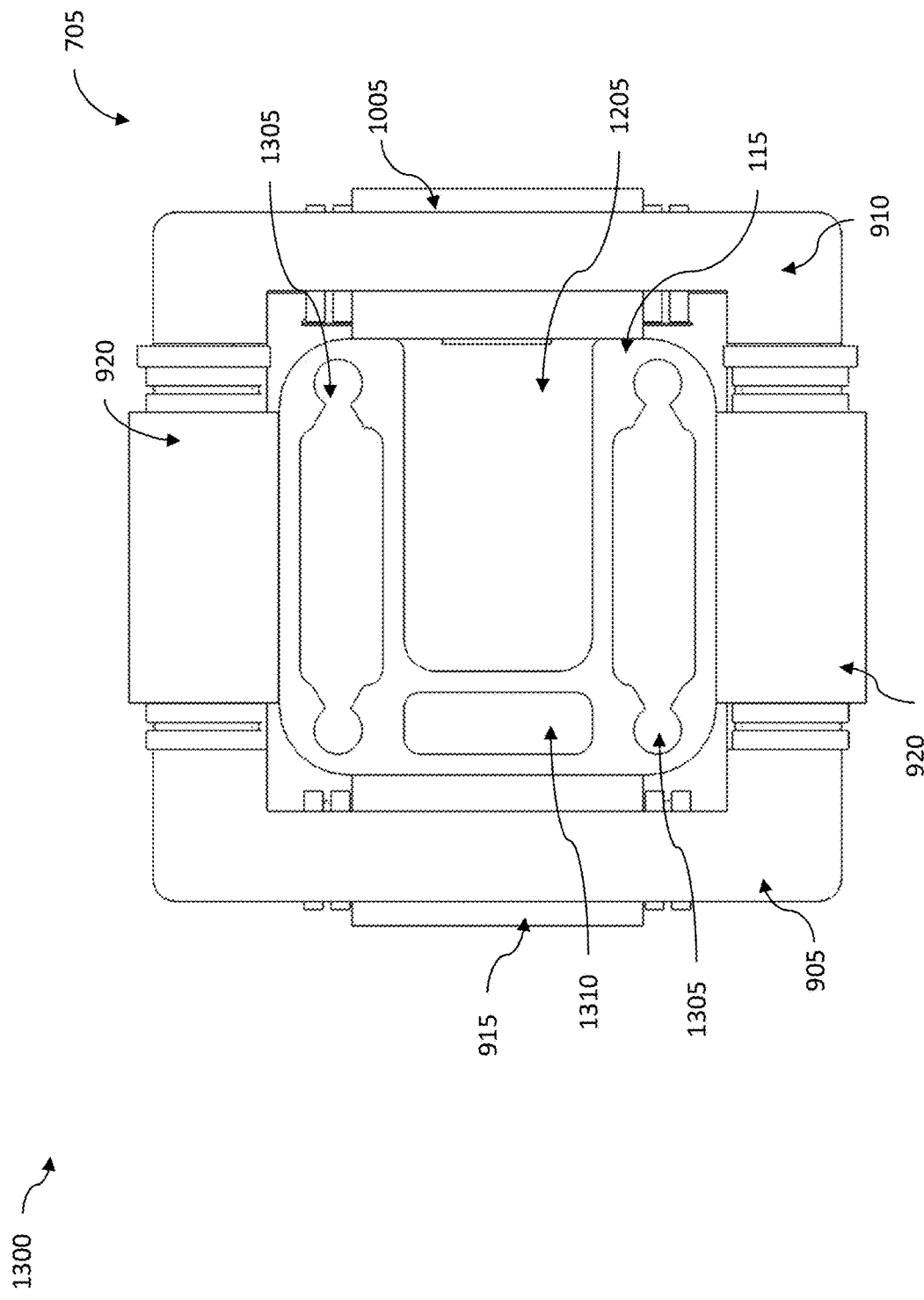
FIG. 13 is a diagram illustrating an exemplary embodiment of the lift carriage enclosing a portion of the mast of the mobile manipulation system as described herein.

FIG. 13 is a diagram illustrating an exemplary embodiment of the lift carriage 705 enclosing a portion of the mast 115 of the mobile manipulation system 100 as described herein. FIG. 13 illustrates a cross-sectional view of the lift carriage 705 and a portion of the mast 115 that is enclosed by the lift carriage 705. As shown in FIG. 13, the mast 115 can include a plurality of first passages 1305 and a second passage 1310 extending along the length of the mast 115 and configured therein. The plurality of first passages 1305 can convey one or more cables/lines therein to the head assembly 120 atop the mast 115. The cables/lines can include at least one of a data cable, a power cable, and/or a pneumatic line. The second passage 1310 can convey additional cables/lines therein to the head assembly 120.

Figure 14:
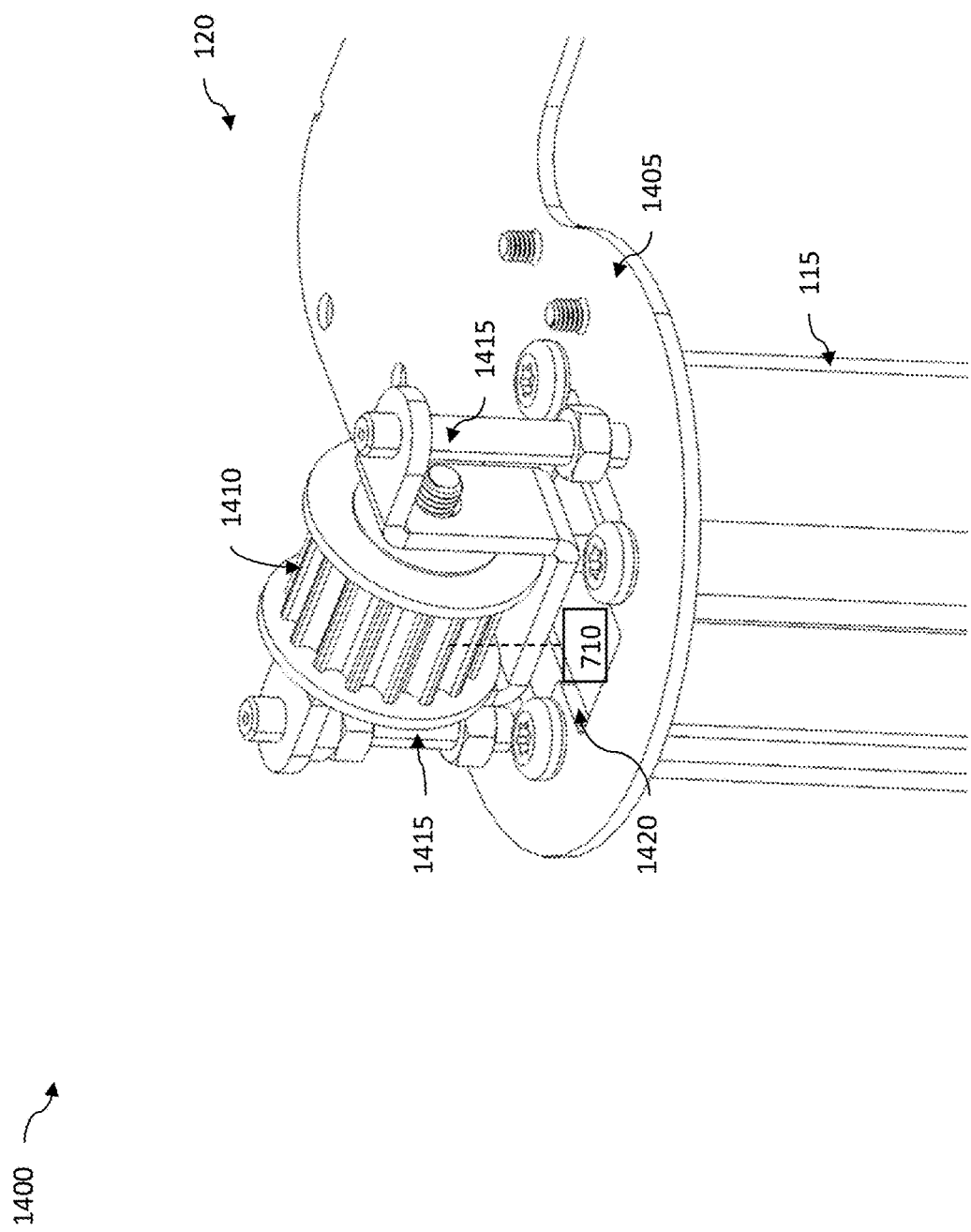
FIG. 14 is a diagram illustrating an exemplary embodiment of a head assembly of the mobile manipulations system as described herein.

FIG. 14 is a diagram illustrating an exemplary embodiment 1400 of a head assembly 120 of the mobile manipulations system 100 as described herein. The head assembly 120 can be mounted atop the mast 115 via a plate 1405. The plate 1405 can be secured to the mast 115 via bolts or screws and can provide a support platform to receive the lift carriage drive element 710. For example, the plate 1405 can be coupled to a pulley 1410. The pulley 1410 can receive and engageably couple to the lift carriage drive element 710. The pulley 1410 can be secured to the plate 1405 via threaded posts 1415. The threaded posts 1415 can be adjustable relative to the plate 1405. Adjusting the threaded posts 1415 can raise or lower the pulley 1410 relative to the plate 1405. Raising or lowering the pulley 1410 via adjustment of the threaded posts 1415 can tighten or loosen the lift carriage drive element 710.

Figure 15:
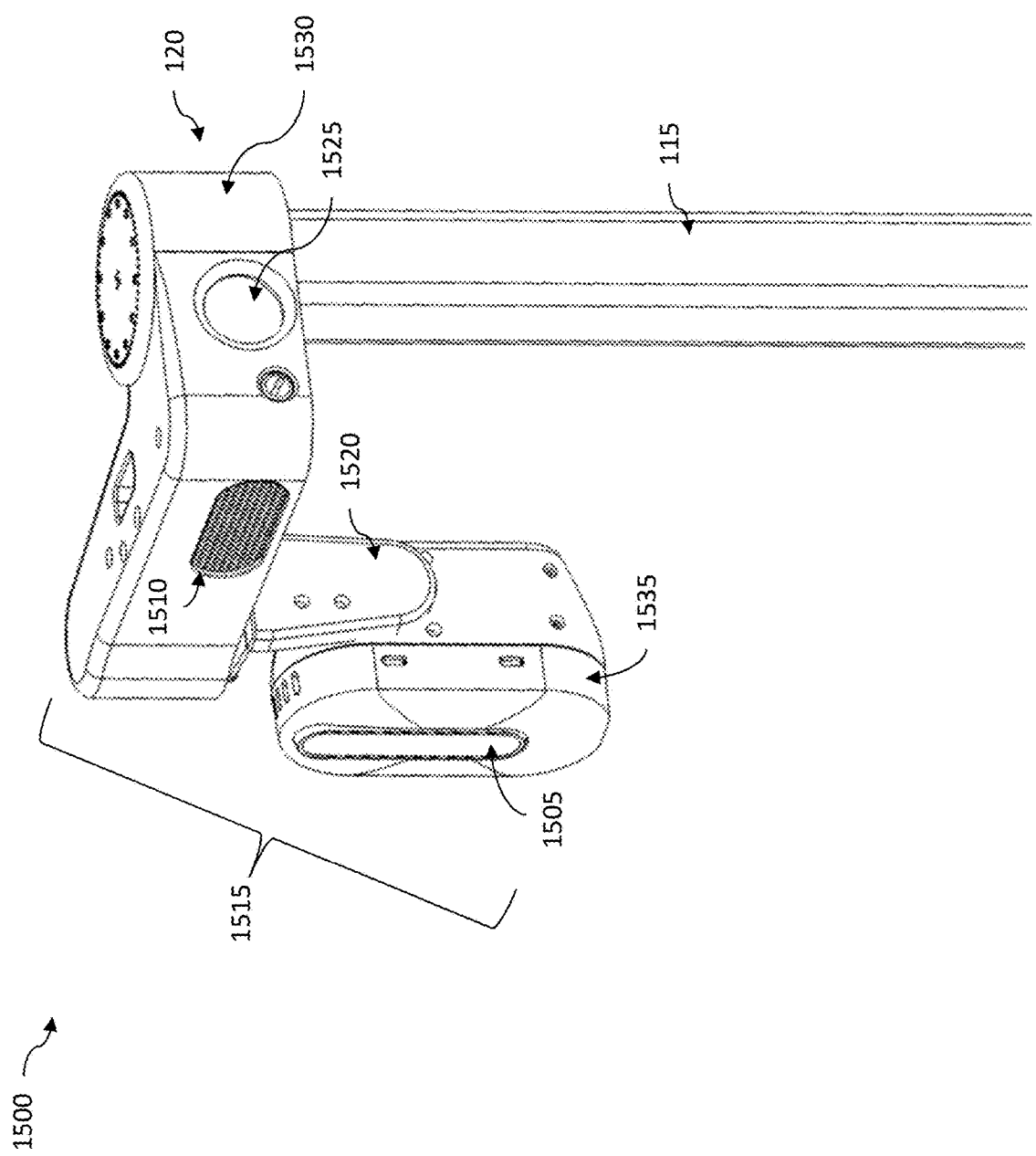
FIG. 15 is a diagram illustrating another exemplary embodiment of the head assembly of the mobile manipulation system as described herein.

FIG. 15 is a diagram illustrating another exemplary embodiment 1500 of the head assembly 120 of the mobile manipulation system 100 as described herein. The head assembly 120 can include additional sensors or collections of sensors. The head assembly 120 can be configured in an elevated configuration relative to the base assembly 105, which can be critical for human-robot interaction, avoiding obstacles during navigation, and providing a downward-view during object manipulation or human-robot interaction.

For example, the head assembly 120 can include sensor 1505 and a collection of peripheral devices or sensors 1510, which can collectively represent a first collection of sensors 1515. In some embodiments, the collection of peripheral devices 1510 can represent the first collection of sensors. Sensor 1505 can include a microphone array, a speaker, a depth finder, a camera, or a laser rangefinder. The collection of peripheral devices 1510 can also include a microphone array, a speaker, a depth finder, a camera, or a laser rangefinder. By co-locating visual sensors, auditory sensors, and feedback devices, such as speakers, in the head assembly 120, a more robust user experience is provided by directing verbal commands to the head assembly 120 simulating human-human interaction. The collection of sensors 1515 can collect sensor data associated with an operational environment in which the mobile manipulation system 100 is located, as well as specific objects within the operational environment that may be associated with an objective task being performed by the mobile manipulation system 100.

As shown in FIG. 15, the sensor 1505 can be supported by a support structure 1520. The support structure 1520 can support or position the sensor 1505 in an inferior position relative to the support structure 1520 and the remainder of the head assembly 120. This inferior or underhung position can be advantageous to allow the sensor 1505 to articulate and provide a downward view of an object or environment without occlusion from other portions of the head assembly 120. The inferior or underhung configuration can also beneficially protect the sensor 1505 from damage during handling and/or shipping.

The head assembly 120 can also include a user interface 1525. The user interface 1525 can be configured to power cycle one or more of sensor 1505, the collection of peripheral devices 1510, the collection of sensors 1515, as well as the mobile manipulation system 100. Additional user interfaces 1525 can be configured in the head assembly 120 without limit. In some embodiments, the user interface 1525 can include a visual display, such as a touchscreen display. The head assembly 120 can also include a removable shell 1530. The sensor 1505 can also include a removable shell 1535.

Figure 16:
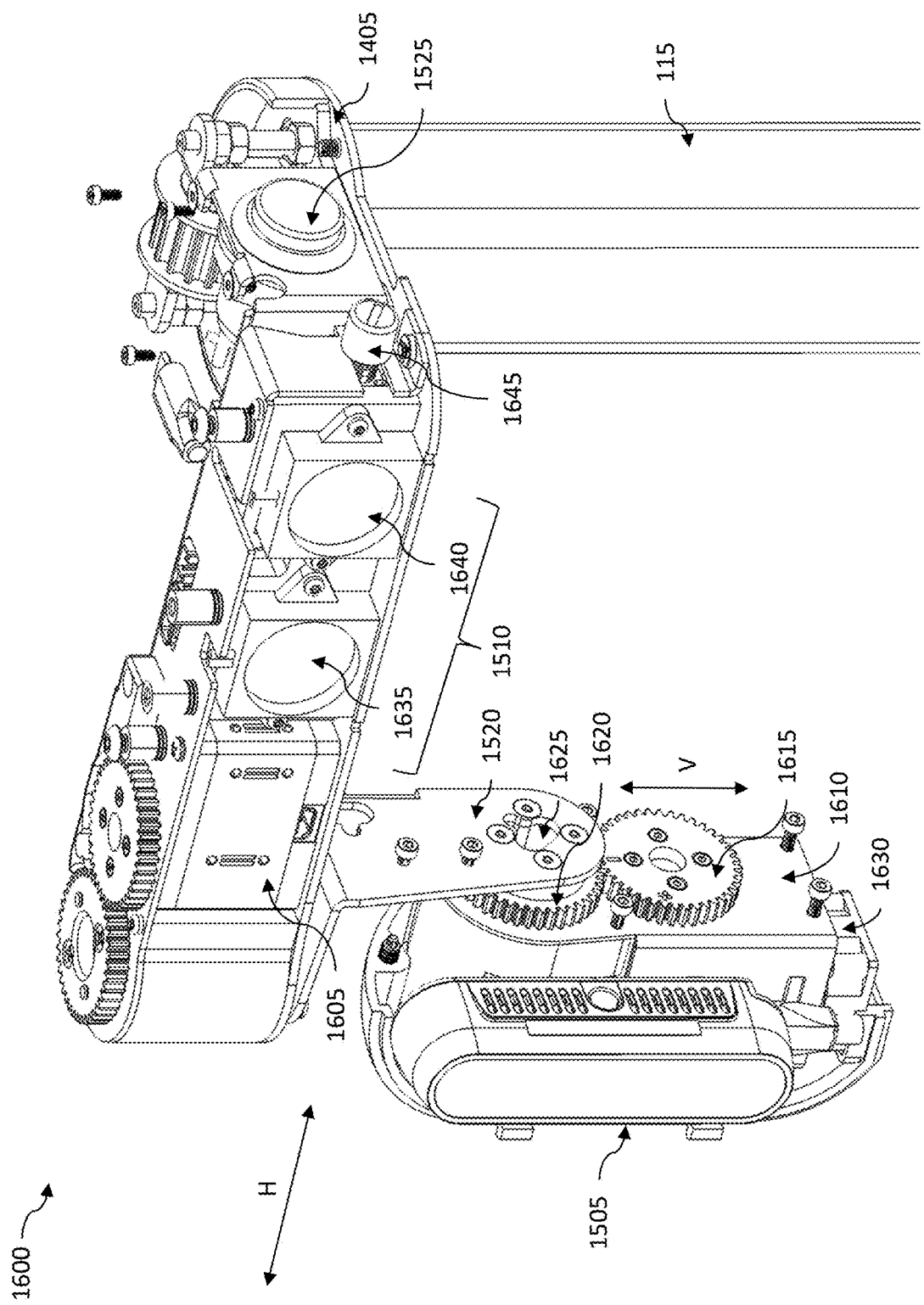
FIG. 16 is a diagram illustrating another exemplary embodiment of the head assembly of the mobile manipulation system as described herein.

FIG. 16 is a diagram illustrating another exemplary embodiment 1600 of the head assembly 120 of the mobile manipulation system 100 as described herein. As shown in FIG. 16, the removable shells 1530 and 1535 have been removed and components of the head assembly 120 can be seen in more detail. The head assembly 120 can include additional actuators configured to control motion of the sensor 1505. For example, actuator 1605 can actuate to rotate the support structure 1520 and the sensor 1505 in a horizontal motion "H" relative to a surface on which the mobile manipulation system 100 is located. Horizontal motion "H" can be considering a panning motion. Actuator 1610 can actuate to move the sensor 1505 in a vertical direction "V" relative to a surface on which the mobile manipulation system 100 is located. Vertical motion "V" can be considered a tilting motion.

In some embodiments, the actuators 1605 and 1610 can include a spur transmission (as shown) or a belt transmission. As shown in FIG. 16, actuator 1610 can include a drive mechanism 1615, which can couple to a spur gear 1620. Rotation of the drive mechanism 1615 can cause the spur gear 1620 to rotate and to tilt the sensor 1505 upwards or downwards in a vertical motion "V". The support structure 1520 and the spur gear 1620 can include a hole 1625 through which a data cable and/or a power cable can pass to convey data or power to the sensor 1505. The sensor 1505 can also include a fan 1630 configured to cool the sensor 1505. Advantageously, the configuration of the sensor 1505 and actuator 1610 allows the sensor 1505 and the actuator 1610 to move together, reducing the amount of space occupied by the support structure 1520 during horizontal sweeping motions. Reducing the size of the swept volume can be advantageous for avoiding collisions and aesthetic reasons.

As further shown in FIG. 16, the head assembly 120 can include additional peripheral devices or sensors 1635 and 1640 included in the collection of peripheral devices 1510. In some embodiments, the additional peripheral devices 1635 and/or 1640 can include a 3D depth camera, a red green blue (RGB) camera, a Lidar sensor, a microphone array, or a speaker. In some embodiments the head assembly 120 can include an volume adjustment mechanism 1645 to adjust a volume of a speaker configured within the collection of peripheral devices 1510.

Figure 17:
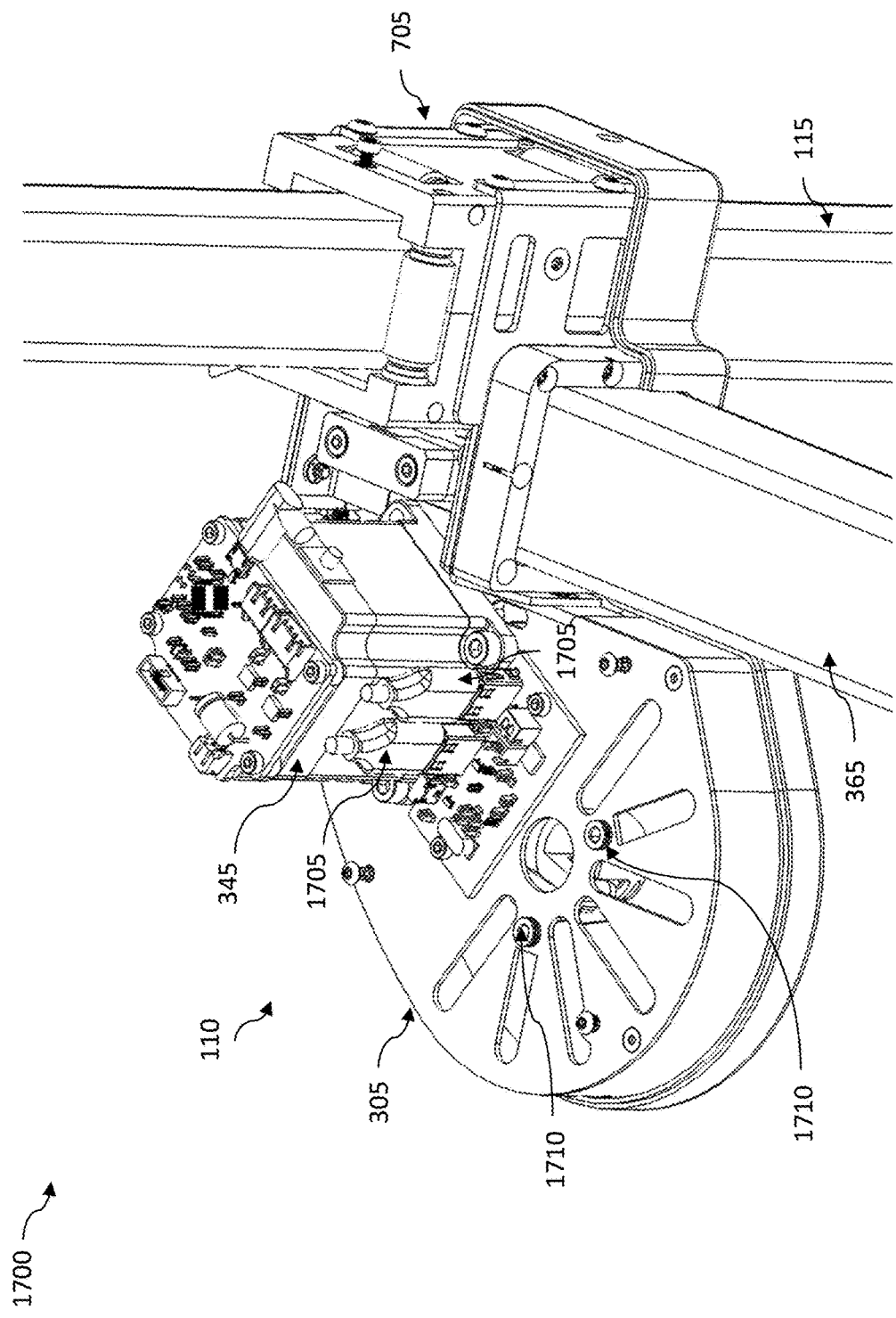
FIG. 17 is a diagram illustrating another exemplary embodiment of the actuation assembly of the mobile manipulation system as described herein.

FIG. 17 is a diagram illustrating another exemplary embodiment of the actuation assembly 110 of the mobile manipulation system 100 as described herein. As shown in FIG. 17, the actuation assembly can include one or more USB ports 1705. The USB ports 1705 can allow a user to input or retrieve data associated with operation of the actuation assembly 110. As further shown in FIG. 17, the actuation assembly 110 can include one or more threaded inserts 1710. The threaded inserts 1710 can receive an additional sensor to couple to the actuation assembly 110. In some embodiments, the additional sensor can include at least one of a microphone array, a speaker, a depth finder, a camera, a laser rangefinder, or a sonar sensor.

Figure 18:
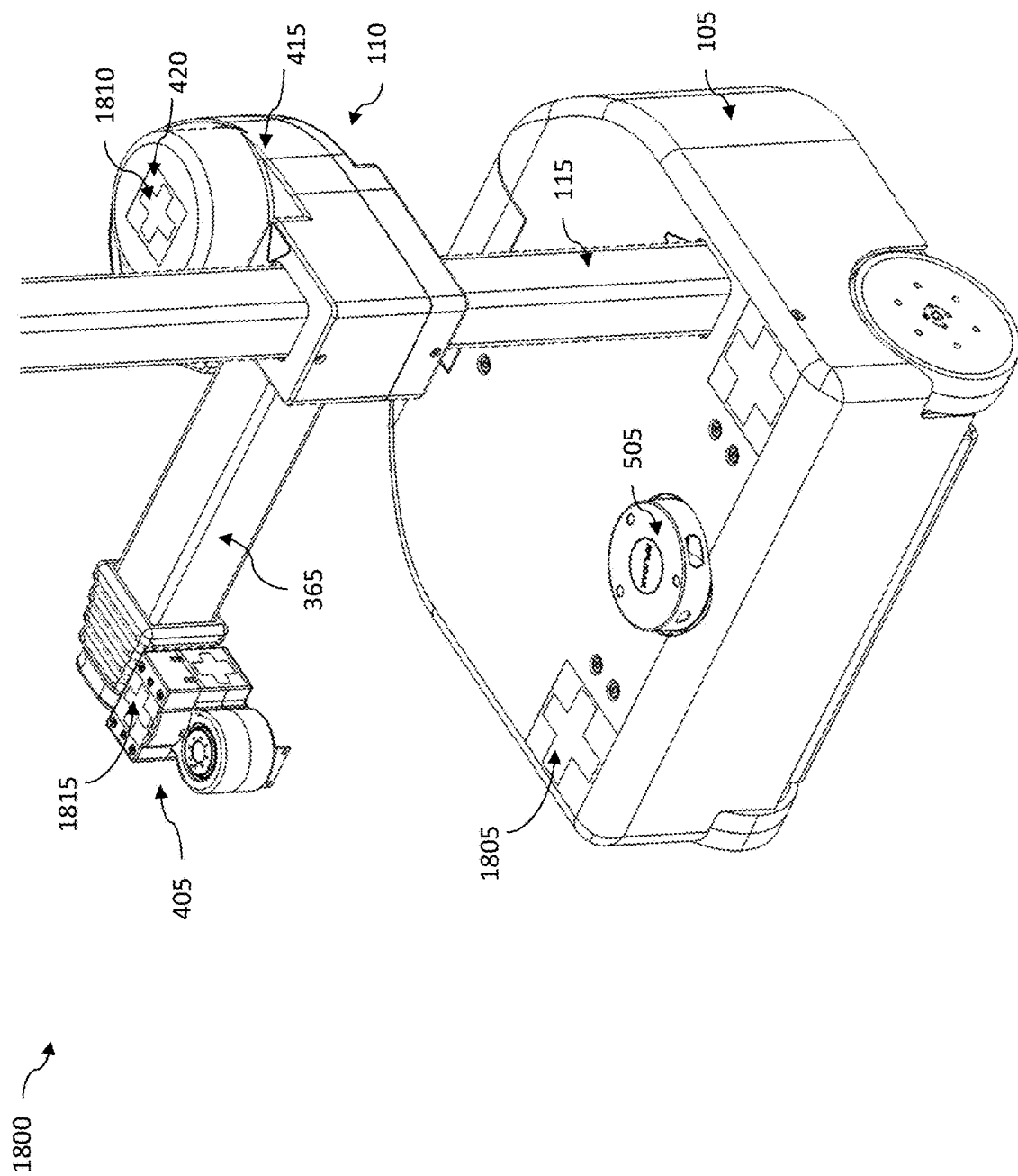
FIG. 18 is a diagram illustrating an exemplary embodiment of one or more fiducial tags of the mobile manipulation system as described herein.

FIG. 18 is a diagram illustrating an exemplary embodiment 1800 of one or more fiducial tags of the mobile manipulation system 100 as described herein. As shown in FIG. 18, the mobile base assembly 105 can include a fiducial tag 1805. The actuation assembly 110 can include a fiducial tag 1810. The manipulation payload 405 can include a fiducial tag 1815. The fiducial tags 1805, 1810, and 1815 can provide visual references or calibration aids for use localizing portions of the mobile manipulation system 100, as well as objective task objects or operating environments that the mobile manipulation system 100 is interacting with. For example, the fiducial tag 1805 can be used to aid the mobile manipulation system 100 to recognize and distinguish the mobile base assembly 105 from a surface on which the mobile base assembly 105 is located, such as when calibrating a position or pose of sensor 1505 relative to a location or pose of the mobile base assembly 105.

Figure 19:
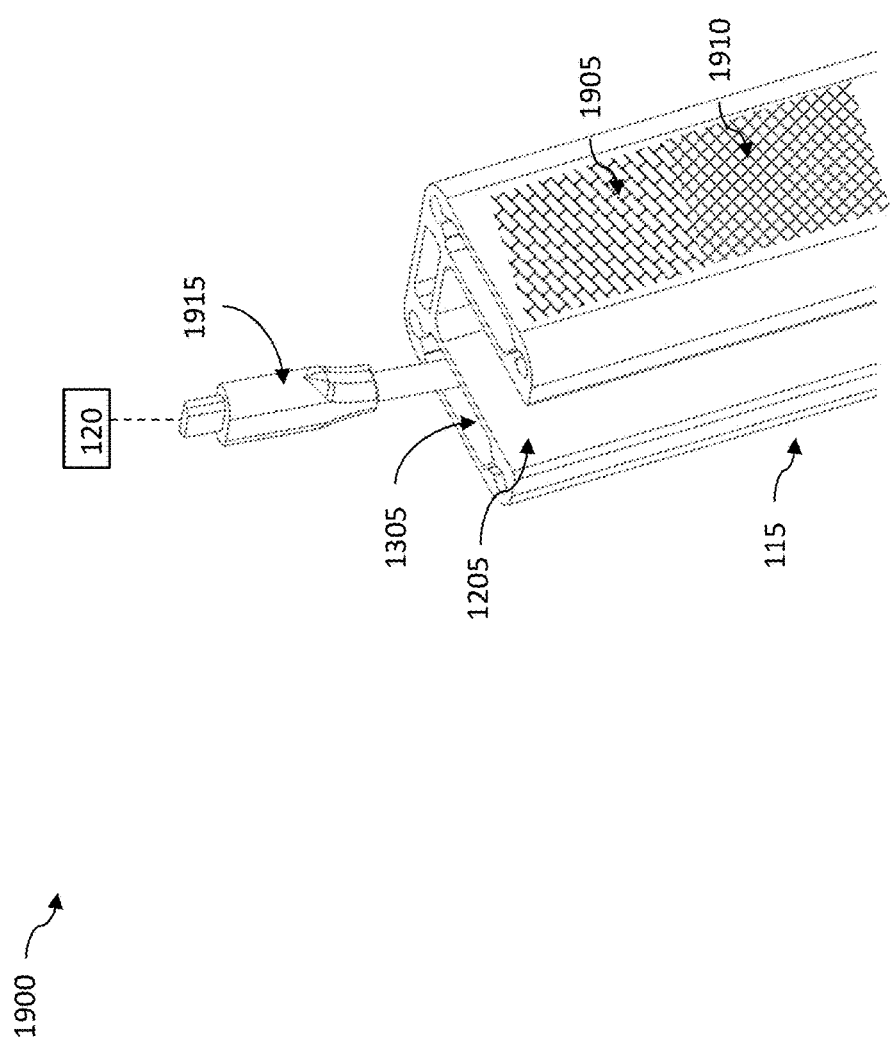
FIG. 19 is a diagram illustrating an exemplary embodiment of one or more surface materials of the mast of the mobile manipulations system as described herein.

FIG. 19 is a diagram illustrating an exemplary embodiment 1900 of one or more surface materials of the mast 115 of the mobile manipulations system 100 as described herein. As shown in FIG. 19, the mast 115 can include one or more surface materials. In one embodiment, the mast 115 can include a reflection-reducing surface material 1905. The reflection-reducing surface material 1905 can provide a more accurate visual depiction of a scene, object, or environment in proximity of the mobile manipulation system 100 that can otherwise be made less accurate due to light reflections coming from the mast 115. In some embodiments, the mast 115 can additionally or alternatively include a non-stick material 1910. The non-stick material 1910 can include a low coefficient of friction, such that when applied to the mast 115, the mast 115 can more easily convey the actuation assembly 110 vertically along the mast 115.

As further shown in FIG. 19, the mast 115 can convey at least one cable/line 1915 within the passage 1305 formed within the mast 115. In some embodiments, the at least one cable/line 1915 can include at least one data cable, at least one power cable, and/or at least one pneumatic line. For example, the at least one cable/line 195 can provide data or power to the head assembly 120 mounted atop the mast 115.

Figure 20:
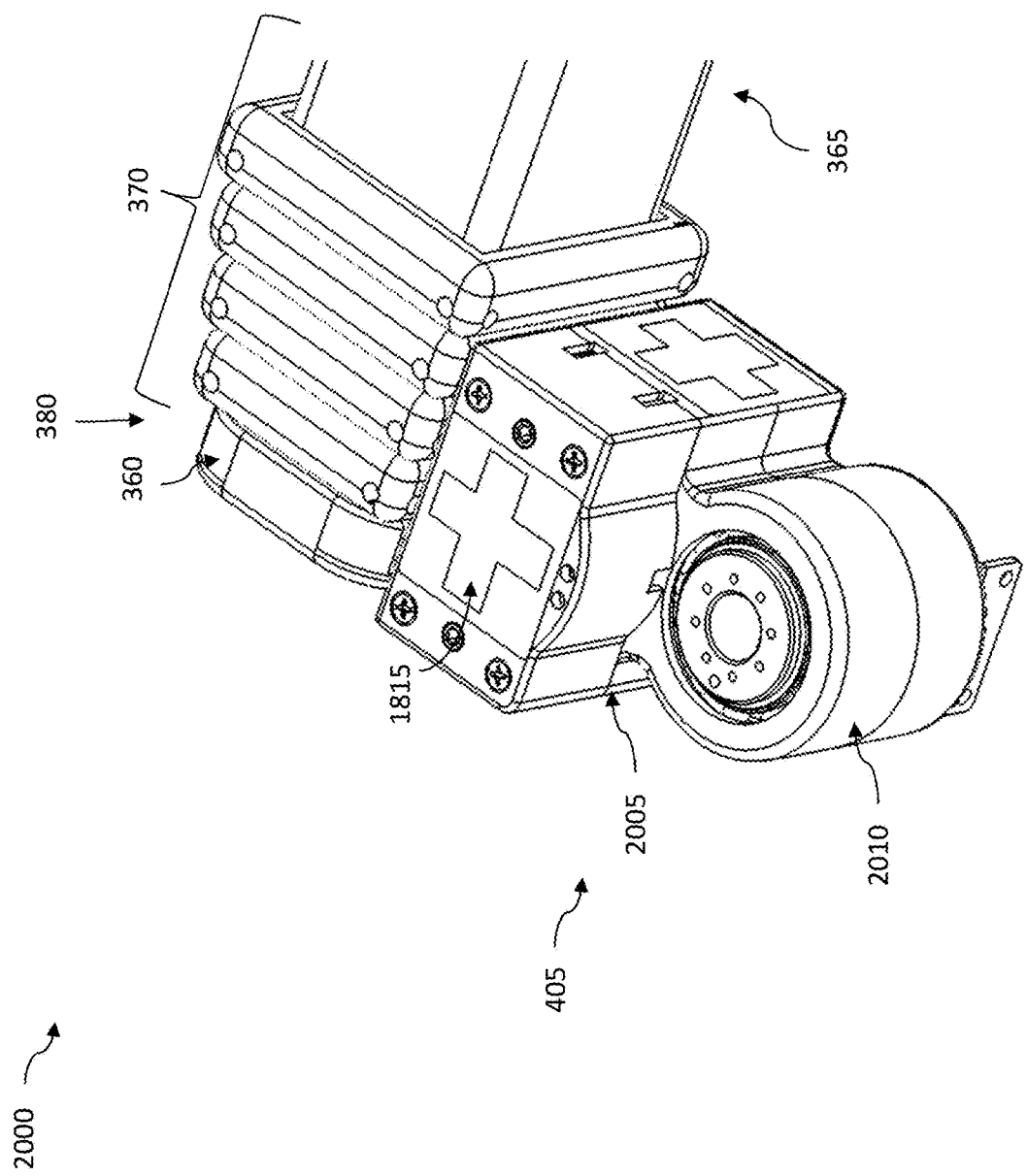
FIG. 20 is a diagram illustrating an exemplary embodiment of a manipulation payload of the mobile manipulation system as described herein.

FIG. 20 is a diagram illustrating an exemplary embodiment 2000 of a manipulation payload 405 of the mobile manipulation system 100 as described herein. As shown in FIG. 20, the mobile manipulation payload 405 can include an actuator 2005 and a payload drive mechanism 2010. The payload drive mechanism 2010 can be actuated by the actuator 2005 and can actuate a manipulation tool or other inter-changeable device, which can be coupled to the payload drive mechanism 2010. As shown in FIG. 20, the manipulation payload 405, the actuator 2005, and the payload drive mechanism 2010 can be configured in an offset configuration relative to the distal segment 360 of the plurality of segments 370.

The payload drive mechanism 2010 can provide a rotational degree of freedom that is oriented parallel to a surface on which the mobile manipulation system 100 is located. As such, the payload drive mechanism 2010 can advantageously enable a manipulation tool or other inter-changeable device coupled to the payload drive mechanism 2010 to be rotated out of a footprint of the mobile base assembly 105 during manipulation and then retracted back within the footprint during navigation or when stowed. In addition, the offset configuration of the manipulation payload 405 can make the components of the manipulation payload 405 more visible to sensor 1505 in the head assembly 120. In this way, the telescopic structure 365 will not obscure views of the manipulator payload 405 during localization, object detection, or navigation by the mobile manipulation system 100.

Figure 21:
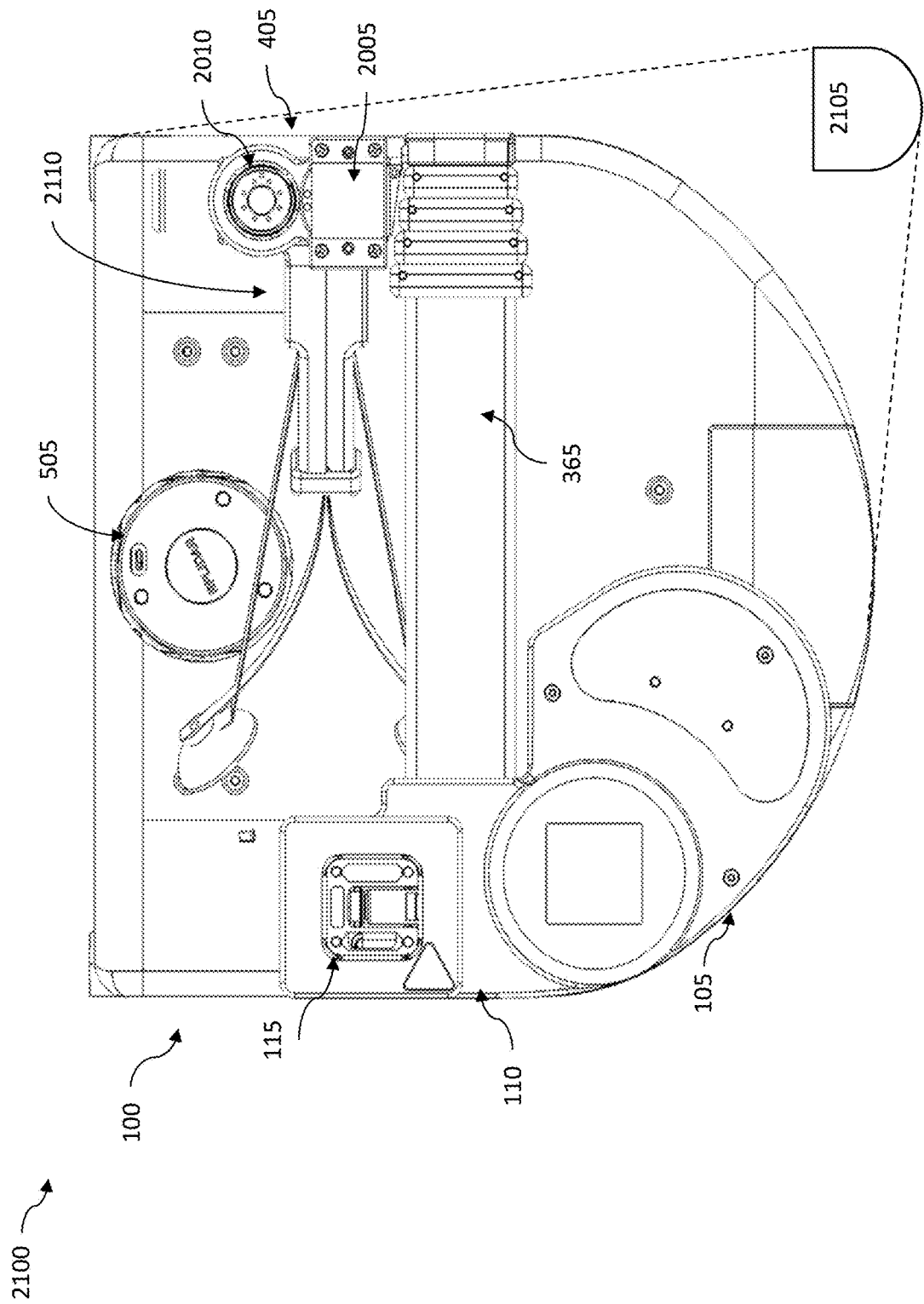
FIG. 21 is a diagram illustrating another exemplary embodiment of the mobile base assembly of the mobile manipulation system as described herein.

FIG. 21 is a diagram illustrating another exemplary embodiment 2100 of the mobile base assembly 105 of the mobile manipulation system 100 as described herein. FIG. 21 illustrates an over-head view of the mobile manipulation system 100 in a stored configuration, such as when inactive or being transported. As shown in FIG. 21, the telescopic structure 365 is fully retracted and the actuation assembly 110 is seated upon mobile base assembly 105. In this way, the actuation assembly 110 can be fully within a footprint 2105 of the mobile base assembly 105. As further shown in FIG. 21, the mobile manipulation system 100 can include a manipulator tool 2110 coupled to the payload drive mechanism 2010. The compact design of the actuation assembly 110 and the manipulation payload 405 enables the manipulator tool 2110 to be within the footprint 2105 when stored or not in use.

Figure 22:
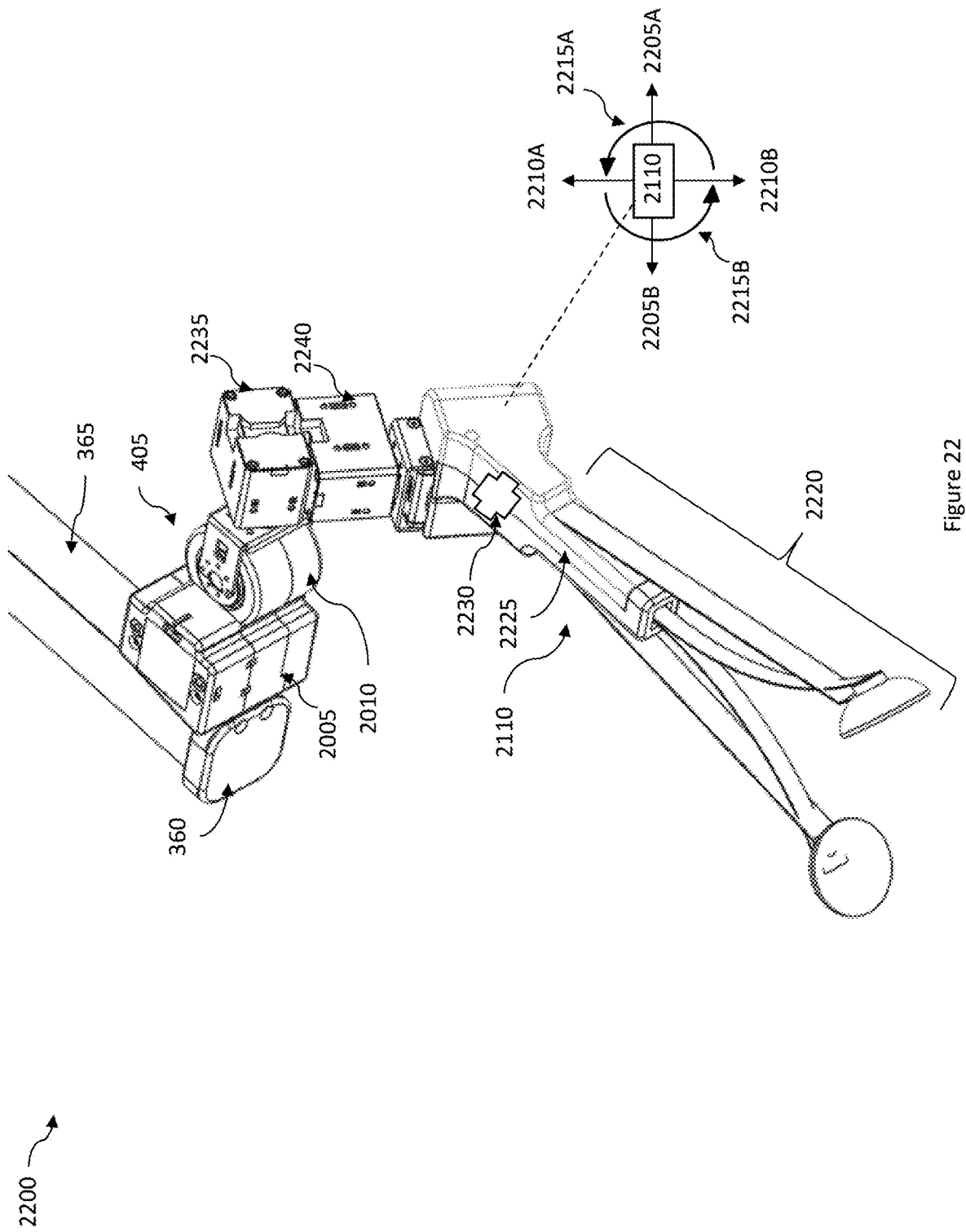
FIG. 22 is a diagram illustrating an exemplary embodiment of a manipulator tool of the mobile manipulation system as described herein.

FIG. 22 is a diagram illustrating an exemplary embodiment 2200 of a manipulator tool of the mobile manipulation system 100 as described herein. As shown in FIG. 22, the manipulator tool 2110 can couple to the payload drive mechanism 2010 and can be actuated to articulate in multiple degrees of freedom relative to a surface on which the mobile manipulation system 100 is located. For example, as shown in FIG. 22, the manipulator tool 2110 can actuate in a yaw motion in the directions of 2205A or 2205B. The yaw motion can be achieved through actuation of the actuator 2205 to cause the payload drive mechanism 2010 to rotate in direction 2205A or 2205B. The manipulator tool 2110 can also actuate in a pitch motion in the directions 2210A or 2210B. The pitch motion can be achieved through actuation of actuator 2235. The manipulator tool 2110 can further actuate in a roll motion in the directions of 2215A or 2215B. The roll motion can be achieved through actuation of the actuator 2240. In some embodiments, the manipulator tool 2110 can actuate in multiple degrees of freedom, such as a roll-pitch-roll motion, or a roll-pitch-yaw motion. Such complex movements can be achieved by sequential or concurrent actuation of the actuator 2205 for yaw motions, actuator 2235 for pitch motions, and actuator 2240 for roll motions.

As further shown in FIG. 22, the manipulator tool 2110 can include a gripping tool 2220. The gripping tool 2220 can be allow the mobile manipulation system 100 to grasp, retrieve, place, or otherwise acquire and/or release objects. For example, the gripping tool 2220 can allow the mobile manipulation system 100 to provide assistive interaction with an object on behalf of a human user, such as grabbing a can of soup, holding a towel, or pulling a handle of a cabinet. In some embodiments, the manipulator tool 2110 can include additional tools in place of the gripping tool 2220, such as a hook, a brush, or a small vacuum cleaner. The gripping tool 2220 can include a removable shell 2225. A channel can be configured within the removable shell 2225 to guide actuation components of the gripping tool 2220. In some embodiments, the manipulator tool 2110 can also include a fiducial tag 2230.

Figure 23:
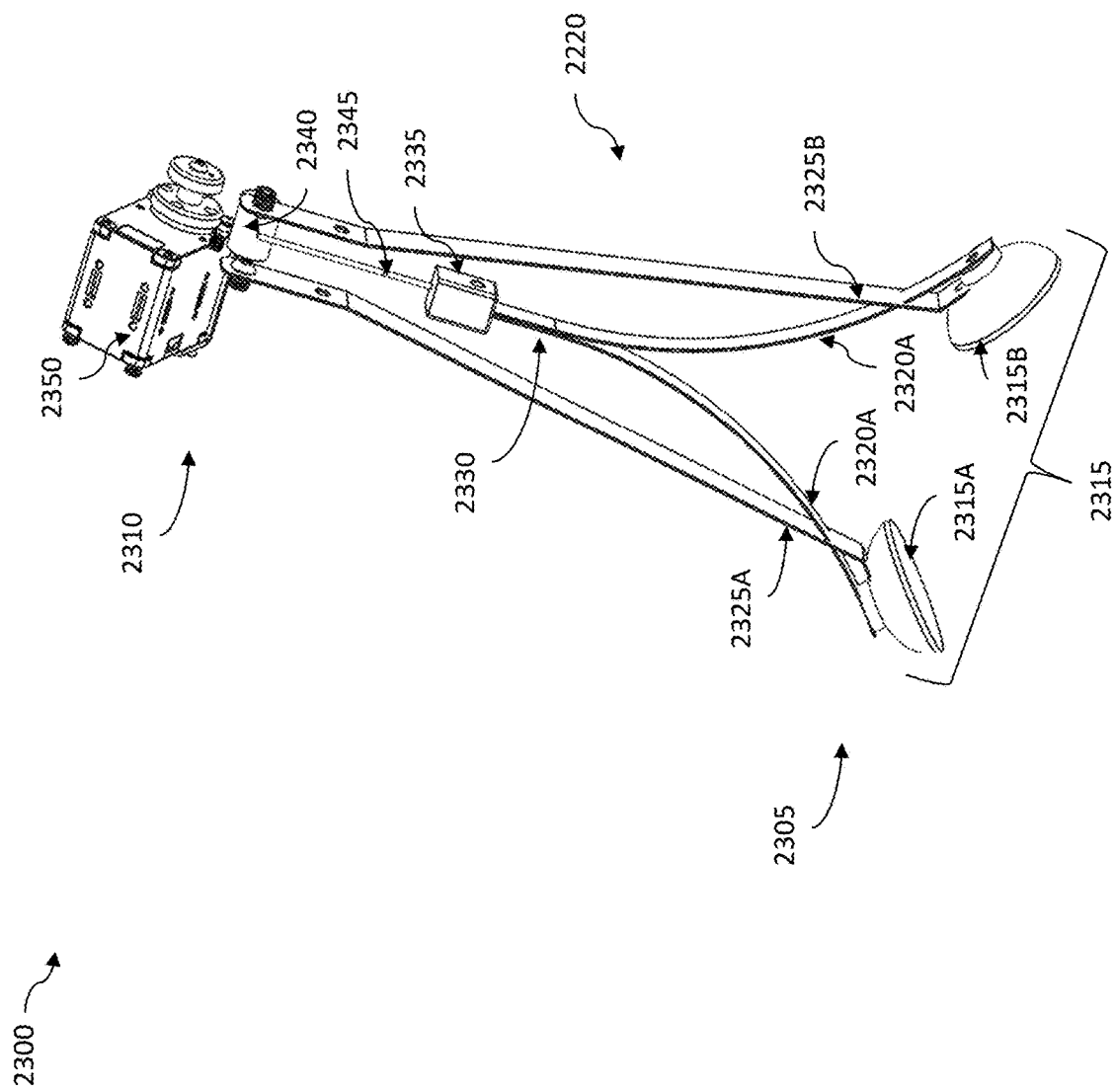
FIG. 23 is a diagram illustrating an exemplary embodiment of a gripping tool of the mobile manipulation system as described herein.

FIG. 23 is a diagram illustrating an exemplary embodiment 2300 of a gripping tool 2200 of the mobile manipulation system 100 as described herein. In FIG. 23, the removable shell 2225 shown in FIG. 22 has been removed. As shown in FIG. 23, the gripping tool 2220 can include a gripping end 2305 and an attachment end 2310. The gripping end 2305 can include a pair of tips 2315, which can include tips 2315A and 2315B. Each tip of the pair of tips 2315 can be coupled to an internal spring arm and to an external spring arm of the gripping tool 2200. For example, tip 2315A can be coupled to internal spring arm 2320A and to external spring arm 2325A. Tip 2315B can be coupled to internal spring arm 2320B and external spring arm 2325B. The internal spring arms 2320A and 2320B can be coupled to form an internal spring arm pair 2330. The external spring arms 2325A and 2325B can be referred to collectively as an external spring arm pair 2325.

As shown in FIG. 23, the internal spring arm pair 2330 can be coupled to a pull-block 2335. In some embodiments, the pull-block 2335 can be configured within a channel formed within the removable shell 2225 to guide the pull-block during operation of the gripping tool 2220. The pull-block 2335 can be coupled to a winding spool 2340 via a winding element 2345. In some embodiments, the winding element 2345 can include a cable or a rope. The gripping tool 2220 can also include an actuator 2350. The actuator 2350 can actuate in a first direction to cause the winding spool 2340 to rotate and to pull the winding element 2345 onto the winding spool 2340. Actuation in this first direction can cause the pull-block 2335 to exert force on the internal spring arm pair 2330 causing the pair of tips 2315 to move toward each other. In this way, an object can be grasped between the pair of tips 2315. Additionally, or alternatively, the actuator 2350 an actuate in a second direction, opposite to the first direction, to cause the winding spool 2340 to rotate and to release the winding element 2345 from the winding spool 2340. Actuation in this second direction can cause the pull-block to release force on the internal spring arm pair 2330 causing the pair of tips 2315 to move away from each other. In this way, an object can be released from the pair of tips 2315.

In some embodiments, the gripping tool 2220 can include attachment features, which can couple to one or more portions of the gripping tool 220. For example, a hook can be configured at the gripping end 2305 on either of the internal spring arms 2320A or 2320B, or on either of the external spring arms 2325A or 2325B.

Figure 24:
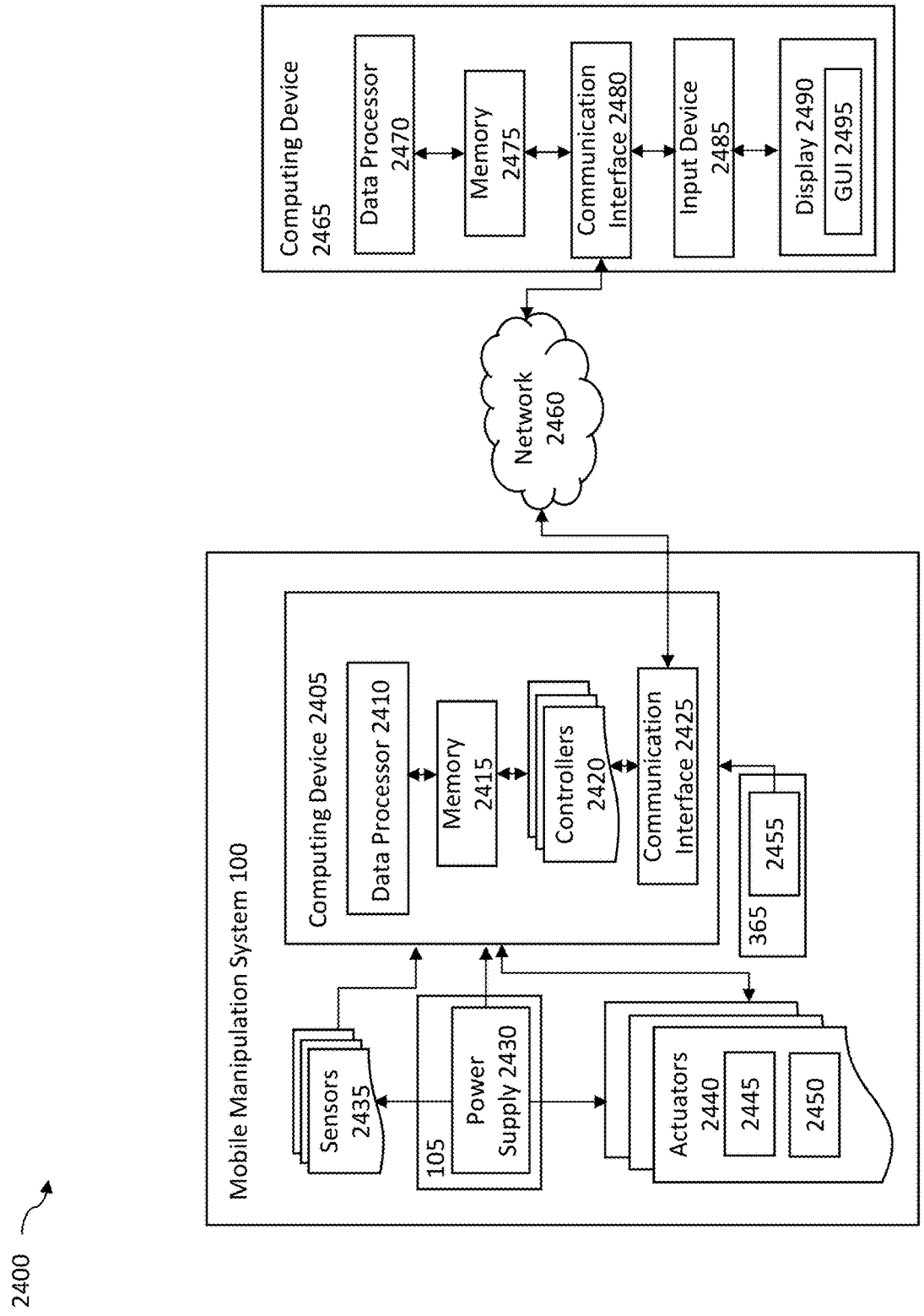
FIG. 24 is a diagram illustrating an exemplary embodiment of a computing architecture of the mobile manipulation system as described herein.

FIG. 24 is a diagram illustrating an exemplary embodiment 2400 of a computing architecture of the mobile manipulation system 100 as described herein. As shown in FIG. 24, the mobile manipulation system 100 can include a computing device 2405 corresponding to the computing device 230 shown in FIG. 2. As shown in FIG. 24, the computing device 2405 can include a data processor 2410 and a memory 2410 storing non-transitory computer-readable instructions which can be executed by the data processor 2410. The computing device 2405 can also include one or more controllers 2420 and a communication interface 2425.

The computing device 2405 can be coupled to a power supply 2430 located in the mobile base assembly 105, such as the battery 225 shown in FIG. 2. The power supply 2430 can be coupled to one or more sensors 2435 and to one or more actuators 2440. The one or more sensors 2435 can include sensors 505, and 1505, as well as the collection of peripheral devices or sensors 1510, each of which can transmit sensor data to the first computing device 2405. One or more additional sensors can be included in sensors 2345. The actuators 2440 can include actuators 210, 220, 345, 605, 1605, 1610, 2005, and 2350. One or more additional sensors can be included in actuators 2440. The actuators 2440 can be coupled to the computing device 2405 and can receive control commands from the computing device 2405. Each actuator 2440 can include a stepper motor configured with a low gear ratio and coupled to a corresponding controller of the controllers 2420. Each stepper motor can be individually controlled via the corresponding controller to actuate according a control command provided from the computing device 2405.

In some embodiments, the one or more controllers 2420 can include a current controller, a force controller, and/or a position controller. The current controller can be configured to generate actuation signals in response to input signals received from the force controller. The actuation signals can be provided to actuators 2440. The force controller can receive inputs associated with a measured interaction force (Fi), a maximum interaction force (Fm), and a desired/objective output force (Fo). The position controller can be configured output the desired or objective output force (Fo) based on inputs of measured and desired/objective position/location data associated with a position/location of the telescopic structure 365.

The actuation signals can be generated in response to sensor data received by the data processor 2410 from sensors 2435. In some embodiments, a force sensor 2450 can be coupled to the telescopic structure 365. The sensor data can include the measured position/location data and the measured interaction force (Fi). In some embodiments, the sensor data can be received from the sensor 2435. In some embodiments, the sensor data can be received from additional sensors, such as additional sensors coupled to one or more components of the mobile base assembly 105, the actuation assembly 110, the head assembly 120, and/or one or more of the actuators 2440. For example, the sensor data can include data received from an encoder 2445 and a current sensor 2450 configured with respect to one or more actuators 2440. The encoder 2445 can generate sensor data based on angular position or motion of a rotating shaft of one or more of the actuators 2440, such as a shaft coupled to the drive mechanism 340. The current sensor 2450 can generate sensor data based on a winding current of one or more of the actuators 2440. The current sensor 2450 can provide an input signal to one or more of the controllers 2420 indicative of a current supplied to the actuators 2440. The one or more controllers 2420 can further control a winding current supplied to one or more actuators 2440 or control a rotor position of one or more actuators 2440. In some embodiments, the telescopic structure 365 can include a position sensor 2455. The position sensor 2455 can generate an input signal provided to at least one of the controllers 2420 indicative of a position of the telescopic structure.

It is advantageous that the mobile manipulation system 100 sense and respond to contact, possibly inadvertently, between portions of the manipulation system 100 and the environment. Measuring motor current can be advantageously used as a proxy to determine interaction forces exerted upon the mobile manipulation system 100. An efficient gear train, such as the mechanical coupling of the actuator 605 and the telescopic structure 365 via the drive mechanism 340 and the drive chain 310 of the actuation assembly 110, can enable interaction force to result in actuator current changes, with a greater degree of sensitivity than inefficient gear trains of traditional actuation systems. Traditional actuation systems can include brushed or rotor-less actuators, which due to the high speed of their operation require higher gear ratios. Actuation systems with lower gear ratios, such as the actuation assembly 110 described herein, can perform better when used in contact sensitive applications where gear rations of less than 10:1 are suitable.

The actuators 2440 can include stepper motors configured with lower gear ratios and closed loop current feedback control for actuation of the wheels in the mobile base assembly 105, the lift carriage 705 via actuator 605, and the telescopic structure 365 via actuator 345. Stepper motors can be configured to generate high torque at low speeds, allowing lower gear ratio transmissions or gear trains to be used. The mobile manipulation system 100 can control coil current of the actuators 2440 based on feedback associated with a rotor position of the actuators 2440. The rotor position can be measured via a Hall effect sensor and a magnet mounted to the actuators 2440. The closed loop current feedback control allows instantaneous actuator current to be determined. In some embodiments, the closed loop current feedback control can be implemented by a position and/or velocity control loop of the actuators 2440 using a proportional-integral-derivative (PID) control loop mechanism.

As further shown in FIG. 24, the computing device 2405 can be coupled to a second computing device 2465 via a network 2460. The second computing device 2465 can be located remotely from the mobile manipulation system 100. In some embodiments, the mobile manipulation system 100 can include the second computing device 2465. The second computing device 2465 can include a data processor 2470, a memory 2475 storing non-transitory computer-readable instructions, a communication interface 2480, an input device 2485 and a display 2490 including a graphical user interface 2495.

The second computing device 2465 can be configured to receive user inputs and to generate control commands to control the mobile manipulation system 100 to perform an objective task, to navigate an environment, or to transmit sensor data to the second computing device 2465. The second computing device 2465 can receive the user inputs via the input device 2485 and/or the GUI 2495. The user inputs can be processed and transmitted via the communication interface 2480 to the communication interface 2425 of the first computing device. In some embodiments, the communication interfaces 2425 and 2480 can be wired communication interfaces or wireless communication interfaces.

Once received, the mobile manipulation system 100 can be configured to generate an actuation signal responsive to the user inputs causing the mobile manipulation system 100 to actuate. In some embodiments, the input device 2485 can include a joystick, a microphone, a stylus, a keyboard, a mouse, or a touchscreen. In some embodiments, the display 2490 can include a touchscreen display and the GUI 2490 can display sensor data and receive user inputs associated with the sensor data. The user inputs can be provided to generate actuation signals to cause the mobile manipulation system 100 to actuate and/or perform an objective task.

Figure 25:
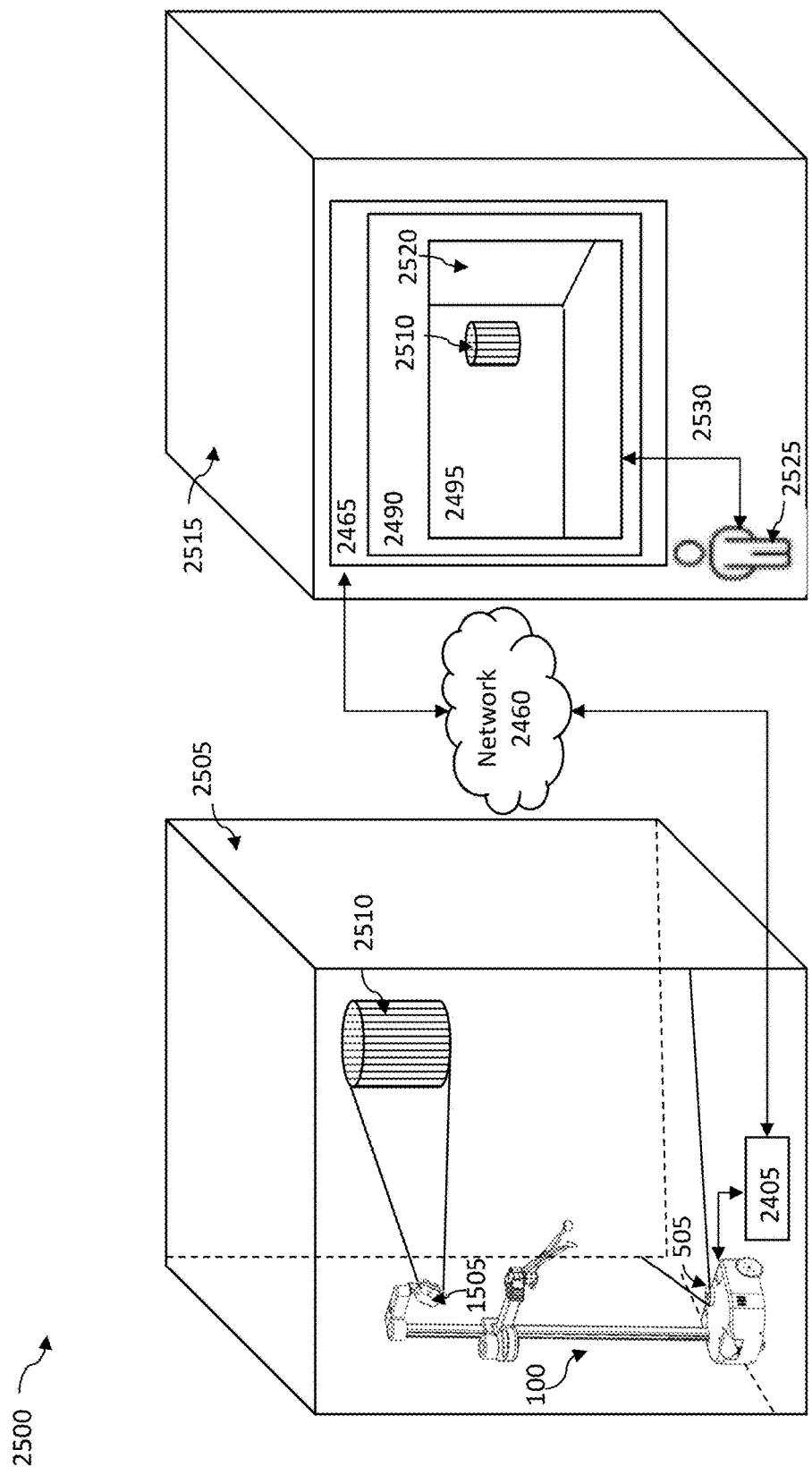
FIG. 25 is a diagram illustrating an exemplary embodiment of a graphical user interface of a computing device coupled to the mobile manipulation system as described herein.

FIG. 25 is a diagram illustrating an exemplary embodiment 2500 of a graphical user interface 2490 of a computing device 2465 coupled to the mobile manipulation system 100 as described herein. As shown in FIG. 25, the mobile manipulation system 100 can be deployed in a first environment 2505 containing an object 2510. The mobile manipulation system 100 can collect sensor data associated with the first environment 2505 and the object 2510 via sensors 505 and 1505. For example, a 2D map of the environment 2505 and the object 2510 can be generated based on sensor data collected via sensor 505 and a visual field of view of the environment 2505 and the object 2510 can be acquired via the sensor 1505 when configured as a camera.

The sensor data associated with the environment 2505 and the object 2510 can be transmitted from the computing device 2405 (corresponding to computing device 230 shown in FIG. 2) to the second computing device 2465 via the network 2460. The second computing device 2465 can provide a visual field of view 2520 of the environment 2505 in the GUI 2495. The visual field of view 2520 can include the object 2510 and other visual data associated with the environment 2505, such as the location of a floor or walls which may be present in the environment 2505. A user 2525 can be present within a second environment 2515 that is remotely located and visually obscured from the first environment 2505 such that the user 2525 does not have direct visual observation of the first environment 2505 or of the mobile manipulation system 100 operating in the first environment 2505.

In response to receiving sensor data associated with the environment 2505 and/or the object 2510 from the first computing device 2405, the second computing device 2465 can provide the visual field of view 2520 of the environment 2505 and/or the object 2510 in the GUI 2495. The user 2525 can provide user inputs 2530 to the GUI 2495 as control commands. The control commands can be transmitted back to the computing device 2405 and executed by the data processor 2410 to cause the mobile manipulation system 100 to perform an objective task associated with the control commands.

For example, when provided with the visual field of view 2520 of environment 2505 containing object 2510 in the GUI 2495, the user 2525 can provide a user input 2530 as a tap or other gesture directed to the object 2510. The user can provide the inputs 2530 while being located in the second environment 2515 that is visually obscured from the environment 2505 in which the object 2510 is located. Responsive to the inputs 2530, the data processor 2470 of computing device 2465 can determine a control command associated with user input 2530 and can provide the control command to the computing device 2405, where upon execution by the data processor 2410, causes the mobile manipulation system 100 to move toward the object 2510 in the first environment 2505. Subsequent and additional user inputs can be received and transmitted as control commands to the mobile manipulation system 100.

Exemplary technical effects of the system described herein include, by way of non-limiting example, an improved mobile manipulation system providing increased contact sensitivity in three cartesian planes and rotational directions in response to interaction forces exerted upon the mobile manipulation system. The system described herein further provides four degree of freedom articulation to autonomous or tele-operated access a larger range of objects in target environments. The system described herein also provides robust performance of objective tasks based on control commands issued with respect to field of view sensor data and improved graphical user interfaces for issuing control commands.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A mobile manipulation system comprising:
   a mobile base assembly including a first computing device, at least two drive wheels including a first drive wheel coupled to a first actuator and a second drive wheel coupled to a second actuator, and a first sensor;
   an actuation assembly comprising
      a first chain cartridge including a drive chain engageably coupled to a drive mechanism of a third actuator, the drive chain including a first plurality of inter-connected links conveying at least one first cable within a first interior space of each of the first plurality of inter-connected links,
      a telescopic structure including a plurality of segments configured to extend and retract telescopically with respect to one another and conveying the drive chain therein, wherein a first end of the drive chain is coupled to a distal segment of the plurality of segments,
      a fourth actuator in the mobile base assembly,
      a second chain cartridge in the mobile base assembly, the second chain cartridge including a drag chain including a second plurality of inter-connected links conveying at least one second cable within a second interior space of each of the second plurality of interconnected links, and
      a lift carriage coupled to the fourth actuator via a lift carriage drive element, wherein the lift carriage includes an internal guide integrally configured within the lift carriage, the internal guide including a receiving portion coupled to a distal link of the second plurality of inter-connected links, and wherein the lift carriage includes a hole through which the at least one second cable passes;
   a mast attached to the mobile base assembly, wherein the actuation assembly translates vertically along the mast and the mast is coupled to the telescopic structure via the lift carriage;

a head assembly atop the mast and including a first collection of sensors; and a manipulation payload coupled to the distal segment of the plurality of segments.

2. The mobile manipulation system of claim 1, wherein one or more of the first actuator, the second actuator, the third actuator, or the fourth actuator includes a stepper motor coupled to a controller.

3. The mobile manipulation system of claim 2, wherein the controller is configured to receive an input signal from a current sensor, to control a winding current supplied to the stepper motor, to receive an input signal from a position sensor, and/or to control a rotor position of the stepper motor.

4. The mobile manipulation system of claim 1, wherein the lift carriage includes a first portion including a first plurality of rollers and a second portion including a second plurality of rollers, and wherein the first portion of the lift carriage and the second portion of the lift carriage are detachably coupled to one another and enclose a portion of the mast.

5. The mobile manipulation system of claim 4, wherein the first plurality of rollers and the second plurality of rollers each include roller elements, thrust bearings on opposite sides of the roller elements, and metal support shafts extending through the roller elements, a first end of a metal support shaft received within the first portion of the lift carriage and a second end of the metal support shaft received within the second portion of the lift carriage.

6. The mobile manipulation system of claim 1, wherein the mast includes a channel within the mast, the channel conveying the drag chain and the lift carriage drive element within the mast as the lift carriage and the telescopic structure translate vertically on the mast.

7. The mobile manipulation system of claim 1, wherein the head assembly includes a plate coupled to the mast, a pair of threaded posts coupled to the plate, and a pulley coupled to the pair of threaded posts, the pulley receiving the lift carriage drive element.

8. The mobile manipulation system of claim 1, wherein at least one sensor of the first collection of sensors is coupled to the head assembly via a support structure configured to position the at least one sensor of the first collection of sensors in an inferior position relative to the support structure.

9. The mobile manipulation system of claim 1, wherein the head assembly includes a user interface button, a fifth actuator configured to rotate the head assembly in a horizontal motion relative to a surface on which the mobile manipulation system is located, and a sixth actuator configured to rotate the head assembly in a vertical motion relative to the surface on which the mobile manipulation system is located.

10. The mobile manipulation system of claim 1, wherein the first sensor includes a laser rangefinder, a camera, or a sonar sensor.

11. The mobile manipulation system of claim 1, wherein the first collection of sensors include at least one of a microphone array, a speaker, a depth finder, a camera, or a laser rangefinder.

12. The mobile manipulation system of claim 1, wherein the actuation assembly includes one or more USB ports, and one or more threaded inserts for attaching additional sensors to the actuation assembly.

13. The mobile manipulation system of claim 1, wherein at least one of the mobile base assembly, the actuation assembly, the manipulation payload, or the manipulator tool includes at least one fiducial tag.

14. The mobile manipulation system of claim 1, wherein the mast includes a surface material including a reflection-reducing material and/or a non-stick material with a low coefficient of friction.

15. The mobile manipulation system of claim 1, wherein the mast includes one or more passages configured to convey at least one third cable to the head assembly.

16. The mobile manipulation system of claim 1, wherein the manipulation payload includes a seventh actuator, a payload drive mechanism, and a manipulator tool coupled to the payload drive mechanism, the manipulator tool actuated via the seventh actuator.

17. The mobile manipulation system of claim 16, wherein the manipulation payload is positioned in an offset configuration relative to the distal segment of the plurality of segments.

18. The mobile manipulation system of claim 16, wherein the manipulator tool actuates in a plurality of motions relative to a surface on which the mobile manipulation system is located, the plurality of motions including a yaw motion, a pitch motion, a roll motion, a roll-pitch-roll motion, and a roll-pitch-yaw motion.

19. The mobile manipulation system of claim 18, wherein the yaw motion causes the manipulator tool to move within a footprint of the mobile base assembly.

20. The mobile manipulation system of claim 16, wherein the manipulator tool includes a gripping tool including a gripping end and an attachment end, the gripping end including a pair of tips, each tip coupled to an internal spring arm and to an external spring arm, wherein the attachment end includes a pull-block coupled to an interior spring arm pair and to a winding spool, the winding spool coupled to an eighth actuator of the gripping tool via a winding element.

21. The mobile manipulation system of claim 1, wherein the mobile base assembly includes a first removable shell and the actuation assembly includes a second removable shell and a third removable shell.

22. The mobile manipulation system of claim 1, wherein the first computing device includes a data processor, a memory storing non-transitory computer-executable instructions, and a communication interface configured to receive control commands from a second computing device, which when executed by the data processor cause the data processor to control the mobile manipulation system to perform an objective task associated with the control commands.

23. The mobile manipulation system of claim 22, wherein the second computing device is located remotely from the first computing device and includes a display and a graphical user interface within the display, the graphical user interface configured to provide a visual field of view of an environment in which the mobile manipulation system is located, the visual field of view generated from sensor data obtained from the first sensor and/or the first collection of sensors.

24. The mobile manipulation system of claim 22, wherein the control commands are generated by a user interacting with the graphical user interface without direct observation of the environment in which the mobile manipulation system is located.

* * * * *